United States Patent
Fujii et al.

(10) Patent No.: US 8,892,333 B2
(45) Date of Patent: Nov. 18, 2014

(54) VEHICLE RANK DISTINCTION DEVICE FOR VEHICLE AND TRAVEL SOUND GENERATOR DEVICE

(75) Inventors: Naoki Fujii, Anjo (JP); Takeyoshi Hirao, Okazaki (JP)

(73) Assignee: Denso Corporation, Kariya (JP)

( * ) Notice: Subject to any disclaimer, the term of this patent is extended or adjusted under 35 U.S.C. 154(b) by 312 days.

(21) Appl. No.: 13/409,350

(22) Filed: Mar. 1, 2012

(65) Prior Publication Data

US 2012/0232769 A1 Sep. 13, 2012

(30) Foreign Application Priority Data

Mar. 9, 2011 (JP) .................................. 2011-52006
Mar. 9, 2011 (JP) .................................. 2011-52007
Mar. 9, 2011 (JP) .................................. 2011-52008

(51) Int. Cl.
  *B60Q 5/00* (2006.01)
  *B60L 11/12* (2006.01)
  *B60Q 7/00* (2006.01)

(52) U.S. Cl.
  CPC ................. B60L 11/12 (2013.01); B60Q 5/008 (2013.01); B60Q 5/00 (2013.01); B60L 2240/12 (2013.01); B60L 2240/441 (2013.01); B60L 2270/42 (2013.01); Y02T 10/7077 (2013.01); Y02T 10/70 (2013.01)
  USPC ........................................... 701/102; 701/22

(58) Field of Classification Search
  USPC .............. 701/22, 101, 102, 103, 104; 381/86; 340/384.1, 384.3, 441, 692, 466
  See application file for complete search history.

(56) References Cited

U.S. PATENT DOCUMENTS

| | | | | |
|---|---|---|---|---|
| 5,635,903 | A * | 6/1997 | Koike et al. | 340/441 |
| 7,606,374 | B2 * | 10/2009 | Maeda | 381/61 |
| 8,299,904 | B2 * | 10/2012 | Konet et al. | 340/384.1 |
| 2005/0113168 | A1 * | 5/2005 | Maeda | 463/35 |
| 2005/0175186 | A1 * | 8/2005 | Yasushi et al. | 381/61 |
| 2005/0232432 | A1 * | 10/2005 | Yasushi et al. | 381/17 |
| 2008/0123871 | A1 * | 5/2008 | Trzmiel | 381/86 |
| 2010/0166210 | A1 * | 7/2010 | Isozaki | 381/86 |
| 2010/0208915 | A1 * | 8/2010 | Lipp | 381/86 |
| 2011/0044470 | A1 | 2/2011 | Ogata | |
| 2011/0153133 | A1 * | 6/2011 | Asahara et al. | 701/22 |
| 2012/0081222 | A1 * | 4/2012 | Tamaki et al. | 340/466 |
| 2012/0299717 | A1 * | 11/2012 | Yoshino et al. | 340/466 |
| 2013/0009769 | A1 * | 1/2013 | Saito et al. | 340/466 |

FOREIGN PATENT DOCUMENTS

| | | |
|---|---|---|
| JP | 2005-31606 | 2/2005 |
| JP | 2005-128262 | 5/2005 |
| JP | 2005-343360 | 12/2005 |
| JP | 2006-302106 | 11/2006 |

\* cited by examiner

*Primary Examiner* — Mahmoud Gimie
(74) *Attorney, Agent, or Firm* — Nixon & Vanderhye PC

(57) ABSTRACT

A signal processing circuit inputs a signal from a rotation speed sensor for detecting a rotation speed of the engine. The signal processing circuit further inputs at least one of a noise signal, which is from a noise detection unit for detecting a noise caused by combustion in an engine equipped to a vehicle, a control signal, which is for controlling a fuel injection valve and/or an igniter of the engine, and a combustion state signal, which is from a combustion state sensor for detecting a combustion state of the engine. A distinction circuit distinguishes a vehicle rank of the vehicle equipped with the engine, according to the rotation speed and the at least one of the noise signal, the control signal, and the combustion state signal.

17 Claims, 23 Drawing Sheets

VEHICLE RANK DISTINCTION DEVICE FOR VEHICLE AND TRAVEL SOUND GENERATOR DEVICE

CROSS REFERENCE TO RELATED APPLICATIONS

This application is based on Japanese Patent Applications No. 2011-52006 filed on Mar. 9, 2011, No. 2011-52007 filed on Mar. 9, 2011, and No. 2011-52008 filed on Mar. 9, 2011, the contents of which are incorporated in their entirely herein by reference.

FIELD OF THE INVENTION

The present invention relates to a vehicle rank distinction device configured to distinguish a vehicle rank of a vehicle. The present invention further relates to a travel sound generator device for a vehicle having an electric motor as a power source, the travel sound generator device configured to notify with sound that the vehicle is in operation with the electric motor.

BACKGROUND OF THE INVENTION

Conventionally, a vehicular device equipped to a vehicle has been designed and manufactured to adapt to a vehicle rank (automobile rank) of the vehicle. For example, in a case where a vehicle is equipped with an engine, a vehicular device is designed and manufactured exclusively to adapt to the feature of the engine, such as the number of cylinders and/or the displacement of the engine. In addition, a vehicular device is designed and manufactured exclusively to adapt to various categories of a vehicle, such as a vehicle rank including a popular car, a luxury car, a track, and/or a passenger car.

It is noted that, a vehicle having an electric motor as a power source emits a small noise when traveling or when being ready to travel. Accordingly, a person inside or outside the vehicle hardly sense that the vehicle is traveling or the vehicle is ready to travel. In consideration of this, a proposed vehicular device is configured to emit a specific sound to notify a person that a vehicle is traveling or a vehicle is ready to travel.

For example, JP-A-2005-343360 discloses a device configured to emit a predetermined alarm sound when a vehicle travels with an electric motor. The device of JP-A-2005-343360 employs a microcomputer to output the alarm sound. The microcomputer is equipped with a memory device for storing data of the alarm sound.

In the case of a conventional device designed and manufactured exclusive to a specific vehicle rank, as described above, one kind of such a conventional device cannot be adaptive to multiple vehicle ranks. Accordingly, such a conventional device is apt to require a high manufacturing cost. It is conceivable to input information representing a vehicle rank into a device when the device is equipped to a vehicle thereby to set an initial configuration of the device. In this case, nevertheless, the initial configuration requires an additional man power.

It is noted that, the device of JP-A-2005-343360 emits a constant alarm sound regardless of the vehicle rank of a vehicle. Accordingly, such a device may possibly cause a person inside or outside the vehicle to feel uncomfortable or unpleasant. Furthermore, the device of JP-A-2005-343360 emits the alarm sound different from a noise caused by actual traveling of the vehicle. Accordingly, such a device may possibly cause a person inside or outside the vehicle to feel uncomfortable or unpleasant.

The conventional configuration requires to secure a storage region in a microcomputer for storing data of a sound source. Processing of a sound at a frequency of several kilohertz imposes a high computation load to a microcomputer. Therefore, an exclusive electronic control device is required for processing such a high-frequency sound. Furthermore, in order to add a function for emitting an operation notification sound to a conventional electronic control unit, a microcomputer with high processing performance is required. As described above, in a conventional configuration, a large-scale device and a large number of circuit components are additionally required in order to produce an operation notification sound.

SUMMARY OF THE INVENTION

The present invention addresses the above disadvantage.

According to an aspect of the present invention, a vehicle rank distinction device comprises a signal processing circuit configured to input: a noise signal from a noise detection unit for detecting a noise caused by combustion in an engine equipped to a vehicle; and a signal from a rotation speed sensor for detecting a rotation speed of the engine. The vehicle rank distinction device further comprises a distinction circuit configured to distinguish a vehicle rank of the vehicle equipped with the engine according to the noise signal and the rotation speed.

According to another aspect of the present invention, a vehicle rank distinction device comprises a signal processing circuit configured to input: a control signal for a fuel injection valve and/or an igniter of an engine equipped to a vehicle; and a signal from a rotation speed sensor for detecting a rotation speed of the engine. The vehicle rank distinction device further comprises a distinction circuit configured to distinguish a vehicle rank of the vehicle equipped with the engine according to the control signal and the rotation speed.

According to another aspect of the present invention, a vehicle rank distinction device comprises a signal processing circuit configured to input: a signal from a combustion state sensor for detecting a combustion state of an engine equipped to a vehicle; and a signal from a rotation speed sensor for detecting a rotation speed of the engine. The vehicle rank distinction device further comprises a distinction circuit configured to distinguish a vehicle rank of the vehicle equipped with the engine according to the combustion state and the rotation speed.

According to another aspect of the present invention, a vehicle rank distinction device comprises a signal processing circuit configured to input a signal from a rotation speed sensor for detecting a rotation speed of the engine, and the signal processing circuit further configured to input at least one of: a noise signal from a noise detection unit for detecting a noise caused by combustion in an engine equipped to a vehicle; a control signal for a fuel injection valve and/or an igniter of the engine; and a combustion signal from a combustion state sensor for detecting a combustion state of the engine. The vehicle rank distinction device further comprises a distinction circuit configured to distinguish a vehicle rank of the vehicle equipped with the engine according to the rotation speed and the at least one of the noise signal, the control signal, and the combustion signal.

According to another aspect of the present invention, a method for distinguishing a vehicle rank, the method comprises inputting a control signal for a fuel injection valve and/or an igniter of an engine equipped to a vehicle. The method further comprises inputting a signal from a rotation speed sensor for detecting a rotation speed of the engine. The method further comprises distinguishing a vehicle rank of the vehicle according to the control signal and the rotation speed.

According to another aspect of the present invention, a method for distinguishing a vehicle rank, the method comprises inputting a signal from a combustion state sensor for detecting a combustion state of an engine equipped to a vehicle. The method further comprises inputting a signal from a rotation speed sensor for detecting a rotation speed of the engine. The method further comprises distinguishing a vehicle rank of the vehicle according to the combustion state and the rotation speed.

According to another aspect of the present invention, a method for distinguishing a vehicle rank comprises inputting a signal from a rotation speed sensor for detecting a rotation speed of the engine. The method further comprises inputting at least one of: a noise signal from a noise detection unit for detecting a noise caused by combustion in an engine equipped to a vehicle; a control signal for a fuel injection valve and/or an igniter of the engine; and a combustion signal from a combustion state sensor for detecting a combustion state of the engine. The method further comprises distinguishing a vehicle rank of the vehicle according to the rotation speed and the at least one of the noise signal, the control signal, and the combustion signal.

According to another aspect of the present invention, a method for notifying operation of the vehicle, the method comprises synthesizing an operation notification sound with a tone according to the distinguished vehicle rank and causing an sound output unit to emit the synthesized operation notification sound.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
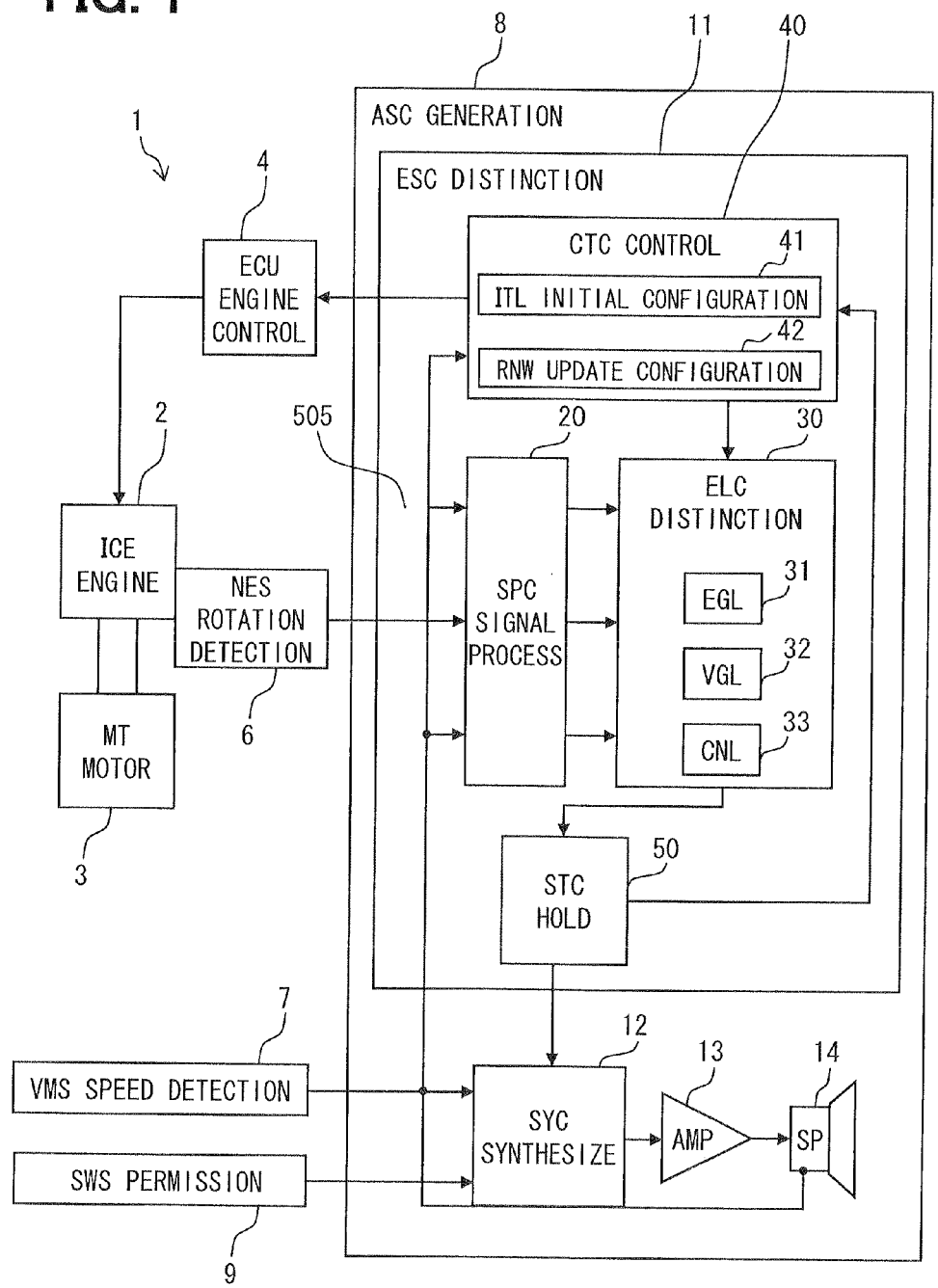
FIG. 1 is a block diagram showing a vehicular system including a generator circuit for a travel notification sound according to the first embodiment.

As follows, embodiments will be described with reference to drawings. In the embodiments, an element described in a subsequent embodiment may be denoted by the same reference numeral, and description of such an element may be omitted. When only a part of a structure of an element is described in an embodiment, other part of the structure of the element may be equivalent to that of another foregoing embodiment. Combinations of elements are not limited to those specified in an embodiment. As long as a combination does not cause a defect, any combinations of elements and embodiments may be made.

(First Embodiment)

FIG. 1 is a block diagram showing a vehicular system 1 including a generator circuit 8 as a travel sound generator device according to the first embodiment. The vehicle is equipped with an internal combustion engine (ICE) 2 and an electric motor (MT) 3. As follows, the internal combustion engine 2 is denoted by an engine 2. As follows, the electric motor 3 is denoted by a motor 3. The motor 3 is a motor alternator configured to function selectively as an electric motor or a generator. The motor 3 is an electric motor for traveling. The vehicle is configured to travel only with the motor 3 at least temporarily. The vehicles is a hybrid vehicle configured to use both the engine 2 and the motor 3 or to use one of the engine 2 and the motor 3, as a power source for traveling. When a predetermined condition is satisfied, the vehicle is configured to stop the engine 2 and to travel only with the motor 3. When the vehicle travels only with the motor 3, the vehicle causes relatively smaller noise, compared with a case where the engine 2 is in operation. In consideration of this, when the vehicle travels only with the motor 3, it is required to emit an operation notification sound for notifying people outside and inside the vehicle of the vehicle's traveling. In addition, in a state where the vehicle is ready to travel, the vehicle may emit an operation notification sound. In the present description, the term of "operation" may mean both a state where the vehicle is traveling and a state where the vehicle is traveling and the vehicle is ready to travel. The term of "operation notification sound" may be equivalent to "vehicle proximity sound," "proximity annunciation sound," or "proximity alarm" when being used in order to notify a pedestrian of proximity of the vehicle. Dissimilarly to a conventional horn buzzer or the like, the operation notification sound is continually emitted during the time when the vehicle travels at a predetermined low speed.

The vehicle is equipped with an engine-control electronic control unit (ECU) 4 for controlling the engine 2. The ECU 4 controls the engine 2 according to signals from multiple sensors. The ECU 4 is configured to control start and stop of the engine 2.

The engine 2 is further equipped with a rotation speed sensor (NES) 6 for detecting the rotation speed NE of the engine 2. The engine 2 is further equipped with a vehicle speed sensor (VMS) 7 for detecting the traveling speed VM of the vehicle.

The vehicular system 1 further includes a generator circuit (ASC) 8 for emitting the operation notification sound. The generator circuit 8 may not be a programmable microcomputer. The generator circuit 8 includes an analog circuitry for processing an analog signal and a logic circuitry for processing a digital signal. The generator circuit 8 may not have a storage area for a program and may include a circuit component, instead of the storage area, for storing or holding an internal distinction result. The generator circuit 8 may not execute a program to proceed with a processing sequentially and may be configured to implement a signal processing in line with a predetermined sequence logic.

The vehicular system 1 further includes a permission device (SWS) 9 configured to permit or prohibit emission of the operation notification sound. The permission device 9 is, for example, a switch device manipulated by a driver of the vehicle or anther electronic control unit equipped to the vehicle. For example, the permission device 9 may be configured to prohibit emission of the operation notification sound when the vehicle parks and to permit emission of the operation notification sound when the vehicle is in the operation state. In addition, when the driver of the vehicle desires to stop emission of the operation notification sound, the driver may manipulate the permission device 9 to prohibit emission of the operation notification sound.

The generator circuit 8 includes a distinction circuit (ESC) 11, a synthetic circuit (SYC) 12, an amplification circuit (AMP) 13, and a speaker (SP, sound output unit) 14. The distinction circuit (ESC) 11 may function as a vehicle rank distinction device (automobile rank distinction device). Specifically, the distinction circuit 11 is configured to estimate and to distinguish the feature of the engine 2 of the vehicle and/or the feature of the vehicle body. The feature of the engine 2 and/or the feature of the vehicle body may represent the rank of the vehicle (vehicle rank, automobile rank) or the vehicle rank. The vehicle rank may be categorized according to multiple indices, such as the classification of the vehicle, the size of the vehicle body, the shape of the vehicle body, the weight of the vehicle body, the classification of the engine 2, displacement (size) of the engine 2, and the number of cylinders of the engine 2. In the present description, the vehicle rank is categorized according to an index, which affects noise emitted when the vehicle travels with the engine 2. The vehicle rank may be categorized according to at least the number of cylinders of the engine 2. In the categorization of the vehicle rank, the displacement of the engine 2 may be further used in addition to the number of cylinders. In the categorization of the vehicle rank, the size of the vehicle body may be further used in addition to the number of cylinders. The vehicle rank, to which the vehicle belongs, may be selected from multiple vehicle ranks comprehensively according to multiple indices. For example, distinction may be made whether the vehicle is a popular car or a luxury car. In addition or alternatively, distinction may be made whether the vehicle body shape of the vehicle is that of a track or that of a passenger car.

The distinction circuit 11 is equipped with a signal processing circuit (SPC) 20, a distinction logic circuit (ELC) 30, a control circuit (CTC) 40, and a hold circuit (STC) 50. The distinction logic circuit 30 determines the signal level of an input signal according to a predetermined rule and outputs a signal according to its determination result. The control circuit 40 is equipped with an initial configuration circuit (ITL) 41 and an update set circuit (RNW) 42. The initial configuration circuit (ITL) 41 causes the distinction logic circuit 30 to start the first processing. The update set circuit (RNW) 42 causes the distinction logic circuit 30 to repeat activation of the processing in order to enhance the accuracy of its distinction. The update set circuit 42 is configured to activate the distinction circuit 11 on determination that the vehicle travels at a speed exceeding a predetermined speed, according to a vehicle speed signal. When the vehicle travels at a speed exceeding a predetermined threshold Vth, it is considered that the engine 2 is in a predetermined relatively stable operation state. When the vehicle reaches such a stable traveling state, the update set circuit 42 updates a vehicle rank signal, which is held in the hold circuit 50, and implements a processing for enhancing the distinction accuracy.

The synthetic circuit 12 synthesizes a sound signal used for emitting the operation notification sound. Specifically, the synthetic circuit 12 synthesizes the sound signal used for emitting the operation notification sound similar to a noise of the engine 2 equipped in the vehicle. The sound signal is outputted from the synthetic circuit 12 and is amplified with the amplification circuit 13. The speaker 14 converts the sound signal amplified with the amplification circuit 13 into an actual sound and emits the operation notification sound. The speaker 14 emits the sound mainly to the exterior of the vehicle. The speaker 14 also emits the sound partially into the interior of the vehicle.

The vehicle rank signal outputted from the distinction circuit 11 is inputted into the synthetic circuit 12. The synthetic circuit 12 outputs a sound signal modulated according to the vehicle rank signal thereby to emit the operation notification sound with a tone according to the vehicle rank signal sent from the distinction circuit 11. With the present configuration, the synthetic circuit outputs the sound signal with a tone according to the vehicle rank. For example, it is assumed that the vehicle rank signal includes the number of cylinders of the engine 2. In this case, the synthetic circuit may output the sound signal with a tone including a periodic large fluctuation when the number of cylinders is small or may output the sound signal with a smooth tone including a small fluctuation when the number of cylinders is large. Alternatively or in addition, it is assumed that the vehicle rank signal includes the displacement (size) of the engine 2. In this case, the synthetic circuit may output the sound signal at a high frequency when the displacement of the engine 2 is small or may output the sound signal at a low frequency when the displacement of the engine 2 is large. Alternatively or in addition, it is assumed that the vehicle rank signal includes the vehicle size. In this case, the synthetic circuit may output the sound signal at a high frequency when the vehicle size is small or may output the sound signal at a low frequency when the vehicle size is large. Alternatively or in addition, it is assumed that the vehicle rank signal includes a luxury of the vehicle. In this case, the synthetic circuit may output the sound signal with a light tone at a high frequency when the vehicle is a popular car or may output the sound signal with a massive tone when the vehicle is a luxury car. Alternatively or in addition, it is assumed that the vehicle rank signal includes a purpose of the vehicle. In this case, the synthetic circuit may output the sound signal with a silent and smooth tone when the vehicle is a passenger car or may output the sound signal with a loud and fluctuating tone when the vehicle is a track.

The vehicle speed signal, which represents the traveling speed of the vehicle, is inputted from the vehicle speed sensor 7 into the synthetic circuit 12. The synthetic circuit 12 outputs the sound signal modulated further according to the vehicle speed thereby to emit the operation notification sound with a tone according to the vehicle speed. For example, the sound signal is synthesized to increase the frequency of the operation notification sound and to increase the sound volume of the operation notification sound, as the vehicle speed increases. The synthetic circuit 12 stops output of the sound signal when the vehicle speed VM becomes greater than or equal to a predetermined threshold speed.

A signal for permitting or prohibiting emission of the operation notification sound is inputted from the permission device 9 into the synthetic circuit 12. The synthetic circuit 12 stops output of the sound signal when the permission device 9 prohibits emission of the operation notification sound.

The distinction logic circuit 30 outputs the vehicle rank signal, which is a distinction result representing the distinguished vehicle rank, to the hold circuit 50. The hold circuit 50 holds the vehicle rank signal. The hold circuit 50 sends the vehicle rank signal, which is currently being held, to the synthetic circuit 12 and the control circuit 40. The hold circuit 50 may be, for example, a storage device or a flip-flop circuit. The hold circuit 50 is supplied with electricity from a vehicle battery to hold the vehicle rank signal after the vehicle is set in the parking state and operation of the vehicle is terminated by deactivating an electric power switch. In this way, the hold circuit 50 holds the vehicle rank signal until the subsequent distinction. With the present configuration, the operation notification sound can be emitted according to the vehicle rank signal held by the hold circuit 50 immediately after subsequent activation of the generator circuit 8.

The generator circuit 8 is equipped with a noise detection unit configured to detect a noise caused by the operation of the engine 2. In the present embodiment, the speaker 14 may function as the noise detection unit. The speaker 14 has a diaphragm oscillated by noise accompanied with the operation of the engine 2. The speaker further has a voice coil moved in response to the oscillation of the diaphragm to cause an electromotive force according to the oscillation of the voice coil. The generator circuit 8 is equipped with a signal wire 505 for inputting the electromotive force caused in the voice coil, as a noise signal. The signal inputted through the signal wire 505 contains a component caused by combustion in multiple cylinders of the engine 2. The component of the signal correlates with the number of cylinders and the intensity of combustion in the cylinders of the engine 2.

Figure 2:
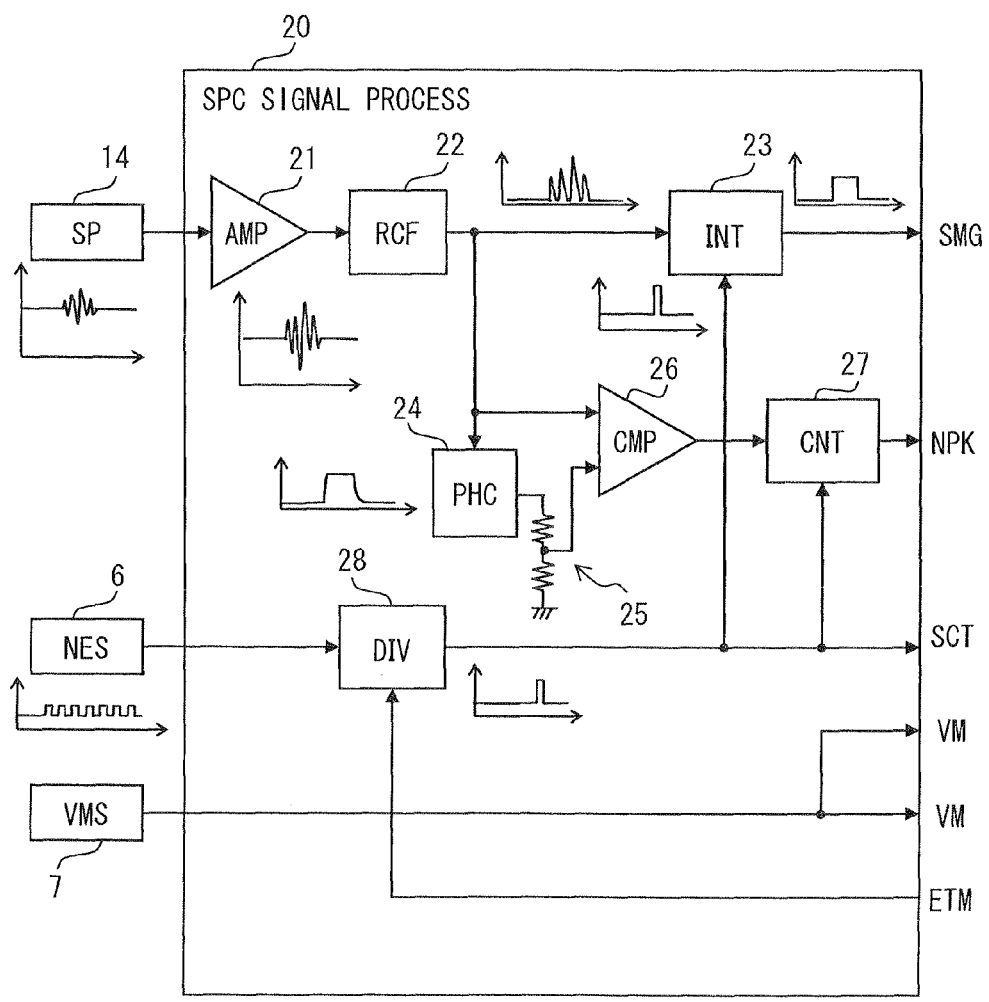
FIG. 2 is a block diagram showing a signal processing circuit according to the first embodiment.

FIG. 2 is a block diagram showing the signal processing circuit 20 of the first embodiment. The signal processing circuit 20 includes an amplification circuit (AMP) 21 and a rectification circuit (RCF) 22. The amplification circuit (AMP) 21 amplifies the noise signal sent from the speaker 14. The rectification circuit (RCF) 22 implements half-wave rectification on the amplified noise signal. The noise signal outputted from the rectification circuit 22 and implemented with the half-wave rectification may be equivalent to a signal for distinction. The signal processing circuit 20 is equipped with an integration circuit (INT) 23. The integration circuit 23 integrates the signals for distinction over a vehicle rank distinction time period, which will be described later. The integration circuit 23 integrates the signals for distinction over the predetermined time period thereby to obtain a signal representing the intensity of noise, in other words, the intensity of combustion caused in the engine 2. Thus, the integration circuit 23 outputs a signal (SMG) representing the magnitude of the signal for distinction. The signal SMG is an integral value of multiple signals for distinction in a time period in which the engine 2 rotates by a predetermined number. In this way, the integration circuit 23 integrates the fuel injection signals in the time period, in which the engine 2 rotates by the predetermined number, and outputs the intensity signal SMG representing the intensity of the combustion. The intensity signal SMG is utilized to distinguish the category of the engine 2.

The signal processing circuit 20 is further equipped with comparison circuits 24, 25, 26. The comparison circuits 24, 25, 26 include a peak hold circuit (PHC) 24, a resistance voltage divider circuit 25, and a comparator circuit 26. The peak hold circuit 24 holds a peak value of the noise signal over a predetermined time period. The resistance voltage divider circuit 25 is equipped with resistor elements to divide the signal level held by the peak hold circuit 24 thereby to set a reference voltage. The comparator circuit 26 compares the noise signal with the reference voltage and outputs pulse signals according to the comparison result. Thus, the comparison circuits 24, 25, 26 convert the noise signal into the pulse signals to distinguish the number of cylinders.

The signal processing circuit 20 is further equipped with a counter circuit (CNT) 27 to count the number of the pulse signals outputted from the comparison circuits 24, 25, 26. The counter circuit 27 counts the pulse signals over the vehicle rank distinction time period, which will be described later. The vehicle rank distinction time period corresponds a time period in which the engine 2 rotates by a predetermined number. Therefore, a count value of the counter circuit 27 corresponds to the number of peaks of the noise signal in the time period in which the engine 2 rotates by the predetermined number. The count value may be equivalent to the number of peaks of the noise signal or a frequency of combustion. In this way, the counter circuit 27 counts the noise signal in the time period, in which the engine 2 rotates by the predetermined number, and outputs a frequency signal NPK representing the frequency of combustion. The frequency signal NPK is utilized to distinguish the number of cylinders of the engine 2.

The signal processing circuit 20 is equipped with a frequency divider circuit (DIV) 28, which implements frequency division on the rotation speed signal inputted from the rotation speed sensor 6. The frequency divider circuit 28 implements the frequency division on the rotation speed signal according to a distinction time set signal (ETM). The distinction time set signal (ETM) is for setting a monitor time period in which the signal is monitored to distinguish the vehicle rank. A frequency-divided rotation speed signal is set as the vehicle rank distinction time period used in a distinction processing based on the signal for distinction. The vehicle rank distinction time period is set such that the engine 2 completes its rotation for a predetermined number within a predetermined time period. In this way, the distinction is made according to the signals for distinction in multiple rotations. Consequently, the distinction is made according the average thereby to enhance its accuracy. The output of the frequency divider circuit 28 is inputted as the vehicle rank distinction time period into the integration circuit 23 and the counter circuit 27. The output of the frequency divider circuit 28 may be equivalent to a distinction cycle signal (SCT) representing the cycle of the rotation speed signal.

Figure 3:
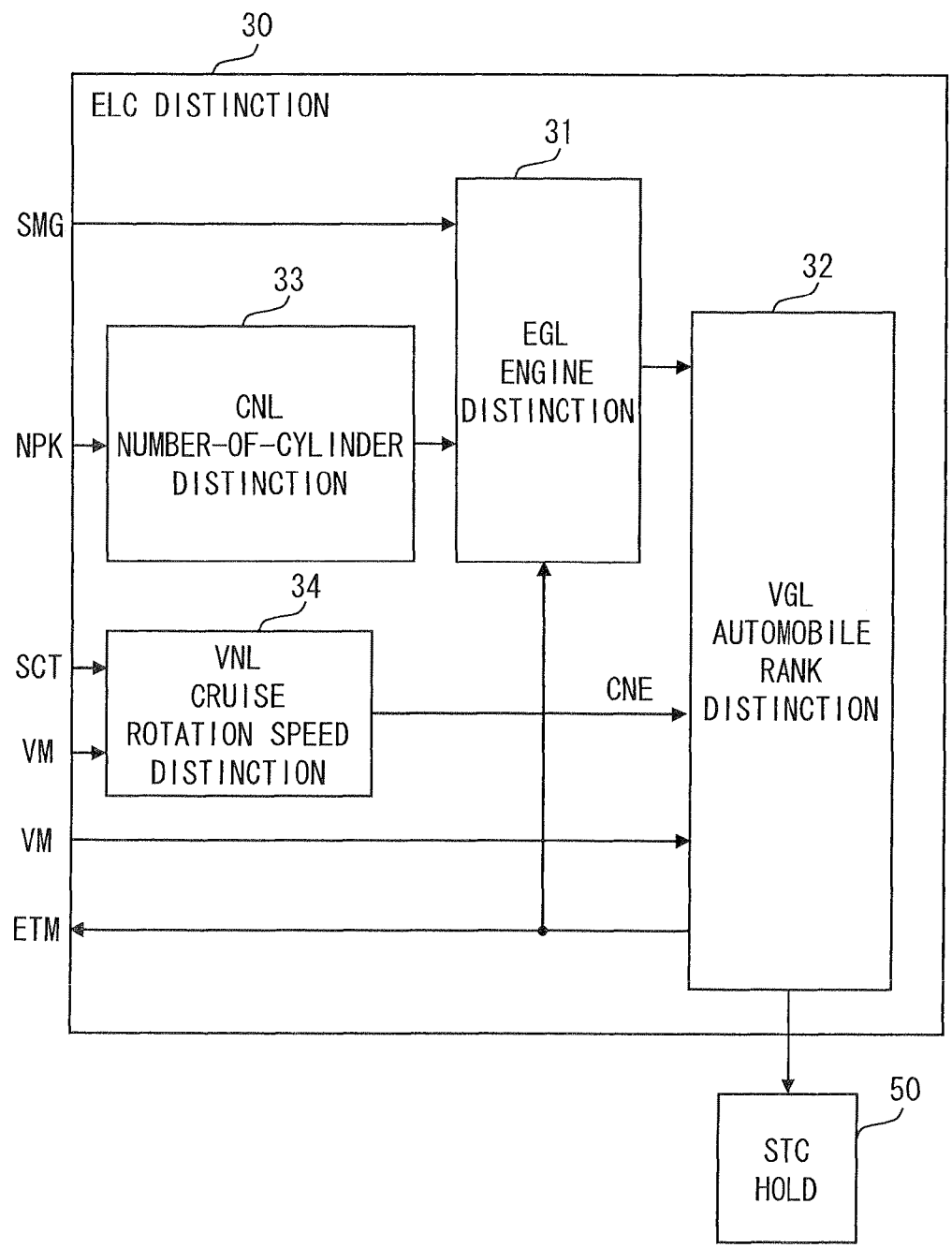
FIG. 3 is a block diagram showing a distinction logic circuit according to the first embodiment.

FIG. 3 is a block diagram showing the distinction logic circuit 30 of the first embodiment. The distinction logic circuit 30 is equipped with an engine distinction circuit (EGL) 31, a vehicle rank distinction circuit (VGL) 32, a number-of-cylinder distinction circuit (CNL) 33, and a cruise rotation speed distinction circuit (VNL) 34. The engine distinction circuit 31 distinguishes an engine category including the displacement of the engine 2. The vehicle rank distinction circuit 32 distinguishes the vehicle rank. The number-of-cylinder distinction circuit 33 distinguishes the number of cylinders of the engine 2. Specifically, the number-of-cylinder distinction circuit 33 distinguishes the number of cylinders of the engine 2 according to the frequency signal NPK in the time period in which the engine 2 rotates by the predetermined number.

The cruise rotation speed distinction circuit 34 detects the rotation speed of the engine 2 when the vehicle travels at a specific vehicle speed. Specifically, the cruise rotation speed distinction circuit 34 detects the rotation speed of the engine 2, as a cruise rotation speed CNE, when the vehicle travels at a cruising speed. The rotation speed of the engine 2 when the vehicle travels at the specific speed reflects the output power of the engine 2 and the weight of the vehicle. Specifically, for example, a small-size car having a small-displacement engine requires a high rotation speed of the engine 2 in order to travel on a highway. To the contrary, a large-size car having a large-displacement engine is capable of traveling on a highway with a relatively low rotation speed of the engine 2. Accordingly, the cruise rotation speed is used as one of the indices for distinguishing the vehicle rank.

The vehicle rank distinction circuit 32 outputs the distinction time set signal ETM for setting the frequency dividing ratio of the frequency divider circuit 28. Therefore, the frequency dividing ratio of the frequency divider circuit 28 is variable. In this case, when the vehicle rank signal is not held in the hold circuit 50 and when the vehicle rank signal is required immediately, the frequency divider circuit 28 sets the frequency dividing ratio to enable the distinction in a short time period. Alternatively, the frequency dividing ratio may be set to increase the distinction time period in order to obtain an average value from a large number of signals thereby to enhance the distinction accuracy. With the present configuration, the accuracy and the distinction time period of the vehicle rank distinction can be set arbitrarily according to an object to distinct. The vehicle rank distinction circuit 32 sets the signal ETM to cause a short distinction time period in an initial configuration made by the initial configuration circuit 41. The vehicle rank distinction circuit 32 further sets the signal ETM to cause a long distinction time period when the update set circuit 42 implements an update configuration. Consequently, the time period for monitoring the signal for distinction and the time period for monitoring the rotation speed signal in order to determine the vehicle rank become variable. With the present configuration, when the distinction result has not been obtained yet, the distinction time period may be shortened thereby to implement early distinction. To the contrary, when the distinction result is already obtained, the distinction time period may be increased thereby to implement distinction with high accuracy. In the present configuration, the vehicle rank distinction circuit 32 may function as an adjustment circuit for adjusting a monitoring time period for controlling the amount of information of the signals for distinction for distinguishing the vehicle rank.

Figure 4:
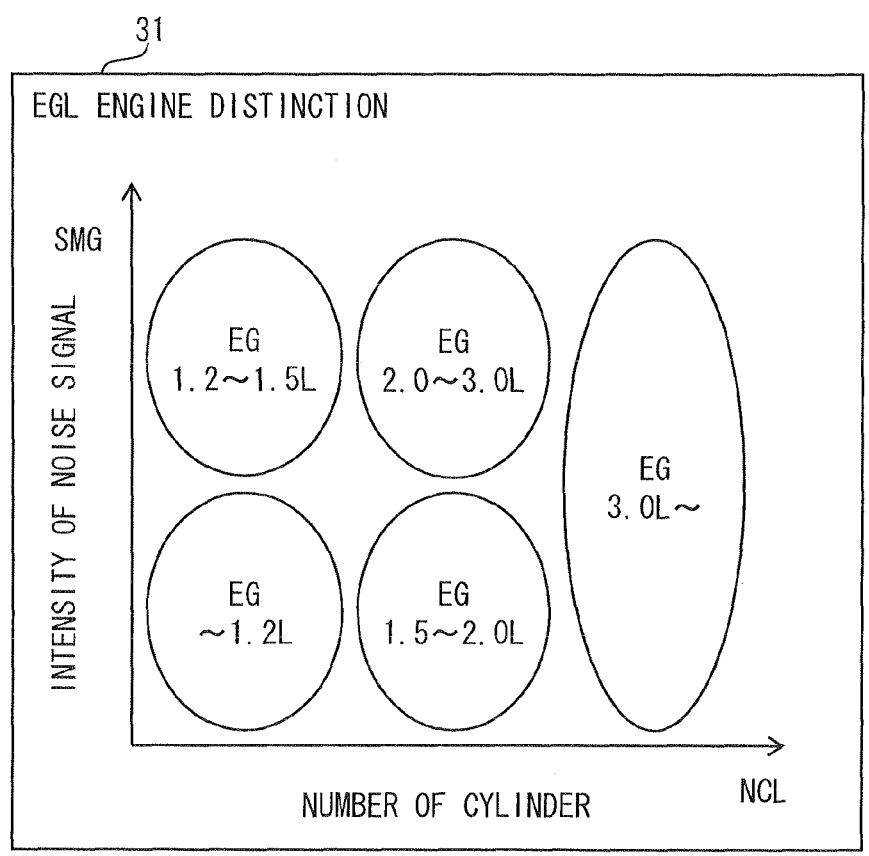
FIG. 4 is a classification view showing a distinction function of the engine distinction circuit according to the first embodiment.

FIG. 4 is a classification view showing a distinction function of the engine distinction circuit 31 of the first embodiment. The engine distinction circuit 31 distinguishes the category of the engine 2 including the displacement of the engine 2, according to the intensity signal SMG and the number of cylinders NCL of the engine 2 outputted from the number-of-cylinder distinction circuit 33. In other words, the engine distinction circuit 31 distinguishes the engine displacement according to the intensity signal SMG and the number of cylinders NCL. The distinction function may be set such that, for example, the displacement increases as the intensity signal SMG increases, and/or the displacement increases as the number of cylinders NCL increases.

Figure 5:
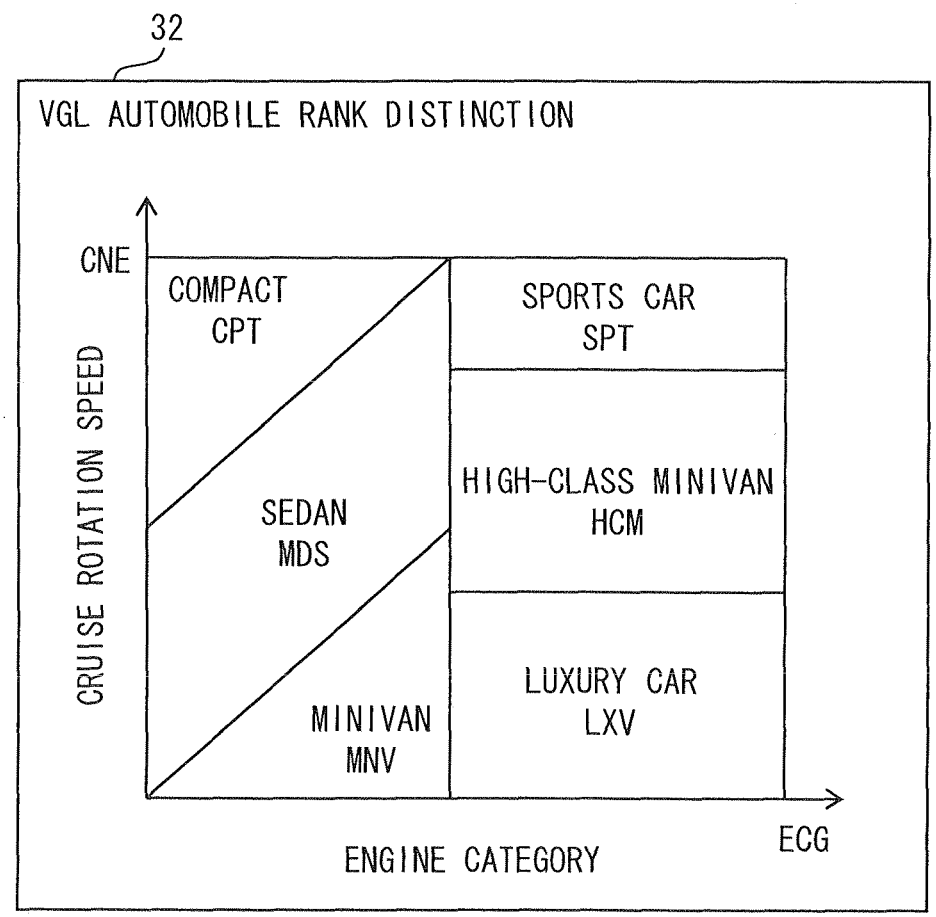
FIG. 5 is a classification view showing a distinction function of a vehicle rank distinction circuit according to the first embodiment.

FIG. 5 is a classification view showing a distinction function of the vehicle rank distinction circuit 32 of the first embodiment. The vehicle rank distinction circuit 32 distinguishes the vehicle rank according to a category ECG (i.e., displacement) of the engine 2 distinguished with the engine distinction circuit 31 and the cruise rotation speed CNE calculated with the cruise rotation speed distinction 34. The vehicle rank distinction circuit 32 distinguishes the vehicle rank from a compact car (CPT), a medium-size sedan (MDS), a minivan (MNV), a sports car (SPT), a high-class minivan (HCM), and a luxury car (LXV). The category ECG of the engine 2 is classified into multiple regions for distinction of the vehicle rank. In the present embodiment, the category ECG of the engine 2 is classified into two regions of a small and middle displacement region and a large displacement region. The cruise rotation speed CNE is classified into multiple regions for distinction of the vehicle rank. The cruise rotation speed CNE in the small and middle displacement region is classified into three regions of a high-rotation speed region, a middle-rotation speed region, and a low-rotation speed region. Specifically, the compact car is assigned to the high-rotation speed region, the medium-size sedan is assigned to the middle-rotation speed region, and the minivan is assigned to the low-rotation speed region. In the small and middle displacement region, each of the boundary lines between vehicle ranks is set to incline upward and rightward such that the cruise rotation speed CNE increases as the displacement increases. The cruise rotation speed CNE in the large displacement region is classified into three regions of a high-rotation speed region, a middle-rotation speed region, and a low-rotation speed region. Specifically, the sports car is assigned to the high-rotation speed region, the high-class minivan is assigned to the middle-rotation speed region, and the luxury car is assigned to the low-rotation speed region. In the large displacement region, each of the boundary lines between vehicle ranks is set laterally such that the cruise rotation speed CNE is substantially constant as the displacement increases.

Figure 6:
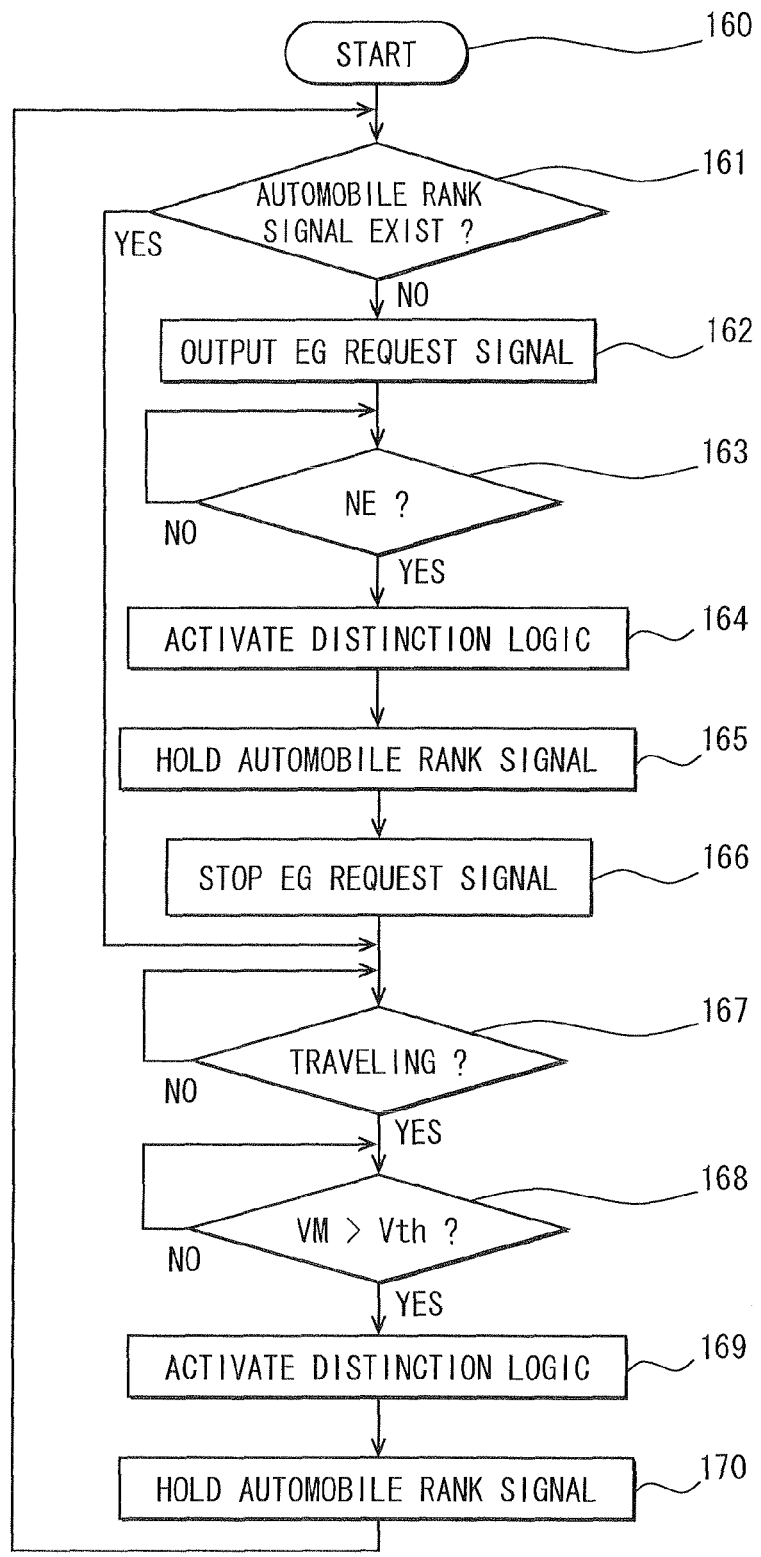
FIG. 6 is a flow chart showing a processing according to the first embodiment.

FIG. 6 is a flow chart showing an operation of the generator circuit 8 of the first embodiment. It is noted that, although the flow chart shows an operation sequence, the generator circuit 8 may not be a microcomputer. FIG. 6 shows a sequence logic of the operation of the generator circuit 8.

The operation starts from step 160 when the power source of the generator circuit 8 is activated. As follows, a case where the generator circuit 8 is equipped to the vehicle for the first time and supplied with electricity from the vehicle battery for the first time will be described. At step 161, it is determined whether the signal representing the vehicle rank is held normally in the hold circuit 50. Immediately after activation of the generator circuit 8 for the first time, the hold circuit 50 does not hold the vehicle rank signal. Therefore, the processing proceeds to step 162. Alternatively, when the vehicle rank signal is held in the hold circuit 50, the processing proceeds to step 166.

At step 162, the generator circuit 8 outputs an engine operation request signal to the ECU 4. In response to the signal, the ECU 4 starts the engine 2, and thereby the engine 2 establishes an operative state of the vehicle. At step 163, it is determined whether the engine 2 rotates and whether the rotation speed signal NE is detected. When the rotation speed signal NE is detected, the processing proceeds to step 164. At step 164, the distinction logic circuit 30 is activated. Thereby, the vehicle rank is distinguished, and the vehicle rank signal is outputted. At step 165, the vehicle rank signal is held in the hold circuit 50. At step 166, output of the engine operation request signal is stopped. Thereby, the ECU 4 determines the control state of the engine 2 and stops the engine 2. Subsequently, the synthetic circuit 12 synthesizes the sound signal for emitting the operation notification sound according to the vehicle rank signal held in the hold circuit 50 and outputs the sound signal. The processing of steps 161-166 is implemented with the initial configuration circuit 41.

At step 167, it is determined whether the vehicle is shifted into the traveling state in which the vehicle uses the engine 2 as a power source while operating the engine 2. When the vehicle is shifted into the traveling state in which the vehicle is driven with the engine 2, the processing proceeds to step 168. At step 168, it is determined whether the vehicle speed VM exceeds the predetermined threshold Vth. When the vehicle speed VM exceeds the threshold Vth, the processing proceeds to step 169. When the vehicle travels at a speed exceeding the predetermined threshold Vth, it is considered that the engine 2 is in the predetermined relatively stable operation state. When the vehicle reaches such a stable traveling state, the generator circuit 8 updates the vehicle rank signal, which is held in the hold circuit 50, and implements the processing for enhancing the distinction accuracy. At step 169, the distinction logic circuit 30 is activated. Thereby, the vehicle rank is distinguished, and a new vehicle rank signal is outputted. At step 170, the new vehicle rank signal is held in the hold circuit 50. Consequently, the vehicle rank signal held in the hold circuit 50 is updated. The synthetic circuit 12 synthesizes the sound signal for emitting the operation notification sound according to the vehicle rank signal held in the hold circuit 50 and outputs the sound signal. The processing of steps 167-170 is implemented with the update set circuit 42.

Subsequent to step 170, the processing returns to step 161 again. The vehicle rank signal held in the hold circuit 50 may be lost due to malfunction of the hold circuit 50 or due to malfunction of the power source. In addition or alternatively, the information held in the hold circuit 50 may be crashed to cause a state where a normal vehicle rank signal is not held. In such a case, the processing from step 161 to step 170 is implemented again to reset the vehicle rank signal.

With the configuration according to the present embodiment, the category of the engine 2 and/or the category of the vehicle body can be distinguished according to the signal for distinction reflecting the combustion state of the engine 2. In addition, the operation notification sound is emitted with a tone according to the distinction result. Consequently, the operation notification sound suitable for the vehicle can be emitted. In addition, the generator circuit 8 distinguishes the category of the engine 2 and/or the category of the vehicle body. Therefore, even when the generator circuit 8 is applied to a different vehicle, the operation notification sound can be emitted according to the vehicle. That is, the operation notification sound can be emitted with one hard configuration of the generator circuit 8 adaptively to various displacements and various vehicle ranks of vehicles. Accordingly, it is not necessary to prepare multiple products suited for multiple vehicle ranks. Thus, cost reduction can be enabled by mass production. Furthermore, the operation notification sound can be emitted with a tone according to the vehicle rank, with a low cost hardware configuration, which does not include a microcomputer.

More specifically, the generator circuit 8 distinguishes at least the number of cylinders of the engine 2 and emits the operation notification sound with a tone according to the distinguished number of cylinders. Accordingly, the generator circuit 8 is enabled to emit the operation notification sound without significant uncomfortable feeling.

In addition, according to the present embodiment, the displacement of the engine 2 is distinguished, and the operation notification sound is emitted with a tone according to the distinguished number of cylinders. Accordingly, the generator circuit 8 is enabled to emit the operation notification sound without significant uncomfortable feeling.

In addition, according to the present embodiment, the rotation speed of the engine 2 when the vehicle travels at the specific vehicle speed is distinguished, and the vehicle rank is distinguished according to the distinguished rotation speed of the engine 2. Furthermore, the operation notification sound is emitted with a tone according to the distinguished vehicle rank. With the present configuration, the generator circuit 8 emits the operation notification sound reflecting features such as the size of the vehicle, the weight of the vehicle, and the type of the vehicle. Accordingly, the generator circuit 8 is enabled to emit the operation notification sound without significant uncomfortable feeling.

Furthermore, in the present embodiment, when there is no initial value of the vehicle rank signal for emitting the operation notification sound, the signal is outputted to require the operation of the engine 2. In this way, the vehicle rank can be distinguished at an early stage, and thereby, the operation notification sound can be emitted according to the vehicle rank at an early stage.

(Second Embodiment)

Figure 7:
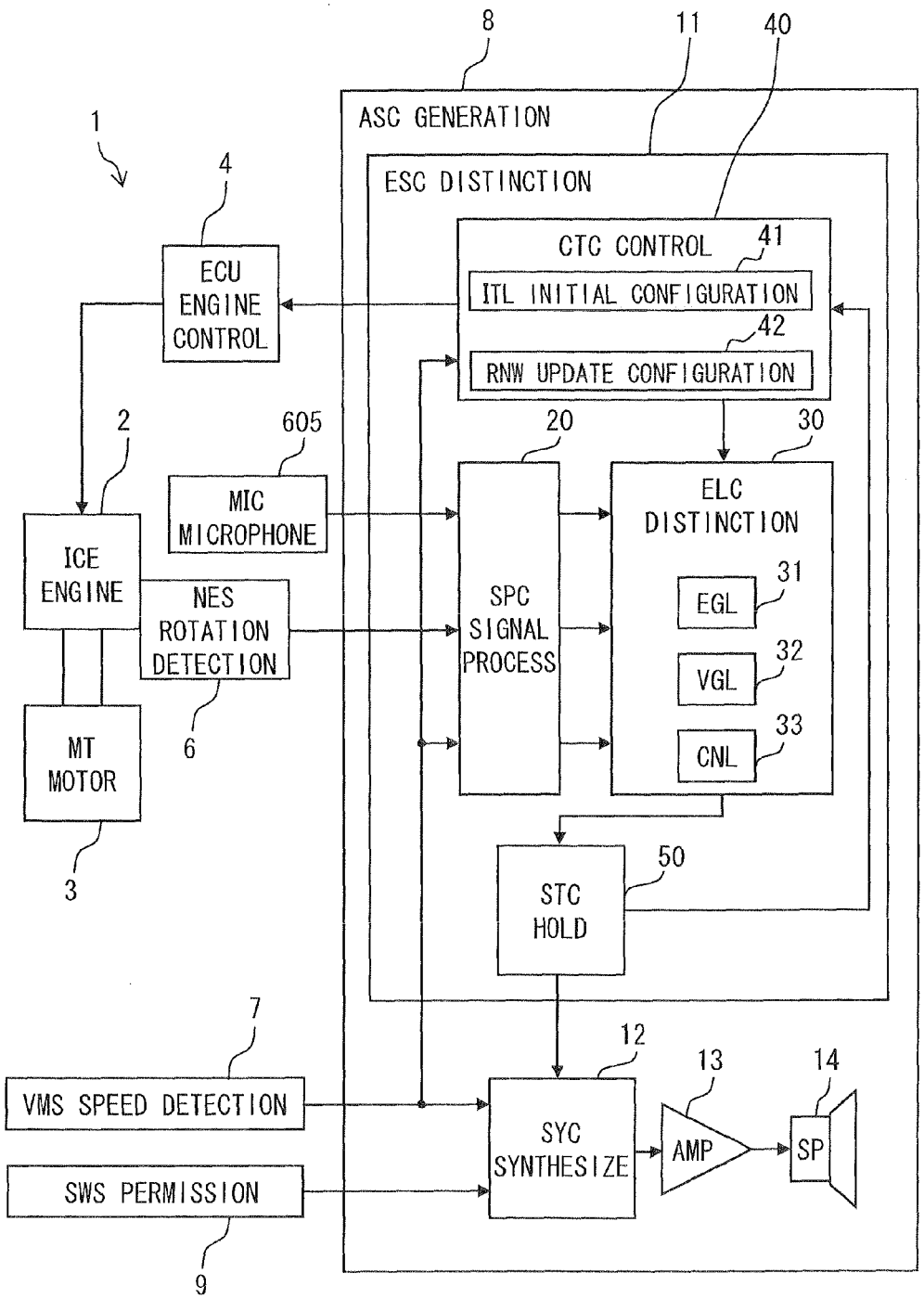
FIG. 7 is a block diagram showing a vehicular system including a generator circuit for a travel notification sound according to the second embodiment.

FIG. 7 is a block diagram showing a vehicular system 1 including the generator circuit 8 for the travel notification sound according to the second embodiment. In the above embodiment, the speaker 14 is employed as the noise detection unit. In addition or alternatively, in the present embodiment, a microphone 605 is equipped as the noise detection unit exclusively to the device. The microphone 605 is configured to detect a noise caused by combustion in the engine 2. The microphone 605 may be located near the engine 2.

(Other Embodiment)

As described above, the embodiments of the present invention have been described. It is noted that, the present invention is not limited to the above embodiments. The present invention may be variously modified and may be in practical use in a sprit of the present invention. The configurations of the embodiments are examples and do not limit the present invention in these descriptions. The present invention includes various modifications.

For example, in the above embodiments, the synthetic circuit 12 outputs the sound signal modulated according to the vehicle speed VM and the vehicle rank signal. Alternatively, the synthetic circuit 12 may be equipped with a storage unit for storing multiple sound signals and a selection unit for selecting one sound signal from multiple sound signals according to the vehicle speed VM. Alternatively or in addition, the synthetic circuit 12 may be equipped with a selection unit for selecting one sound signal from multiple sound signals according to the vehicle rank signal. The synthetic circuit 12 may electrically switch a target value for synthesizing the sound signal according to the vehicle rank signal when the vehicle travels with the motor 3 thereby to determine the tone of the sound signal according to the vehicle rank in a hardware manner.

In the above embodiments, the hold circuit 50 holds the vehicle rank signal being the distinction result. Alternatively, the vehicle rank signal may be held in a storage device of another control device or in a storage device used for another function. A circuit element may be provided to hold an analog value of the signal for distinction, instead of the vehicle rank signal being the distinction result, thereby to enable to obtain quickly the distinction result in subsequent activation of the device.

In addition to the embodiments or alternatively to the embodiments, a circuit may be equipped for activating the distinction circuit 11 on determination that the vehicle stops according to the vehicle speed signal (VM=0). More specifically, the condition at step 168 may be replaced to "VM=0?" In this case, the distinction circuit 11 distinguishes the vehicle rank according to the signal for distinction, when the vehicle stops and is in an idling state. In this way, fluctuation caused in the distinction result, when the vehicle travels in a particular environment such as a rough road, can be removed.

In the above embodiments, the distinction logic circuit 30 includes the engine distinction circuit 31, the vehicle rank distinction circuit 32, the number-of-cylinder distinction circuit 33, and the cruise rotation speed distinction circuit 34 in order to distinguish the vehicle rank comprehensively according to the number of cylinders, the displacement of the engine, and the cruise rotation speed. Alternatively, the distinction logic circuit 30 may distinguish the vehicle rank according to only the number of cylinders or only the displacement of the engine, or according to a combination of the number of cylinders and the displacement of the engine, a combination of the number of cylinders and the cruise rotation speed, or a combination of the displacement of the engine and the cruise rotation speed.

In the above embodiments, the generator circuit 8 is caused to output the operation request signal of the engine 2 to the ECU 4. The generator circuit 8, in general, may have an output terminal for diagnoses, and in this case, the output terminal for diagnoses may be used as an output terminal of the operation request signal. With the present configuration, a terminal and an I/O circuit need not be provided for exclusive use of the operation request signal. Consequently, manufacturing cost can be reduced.

(Third Embodiment)

Figure 8:
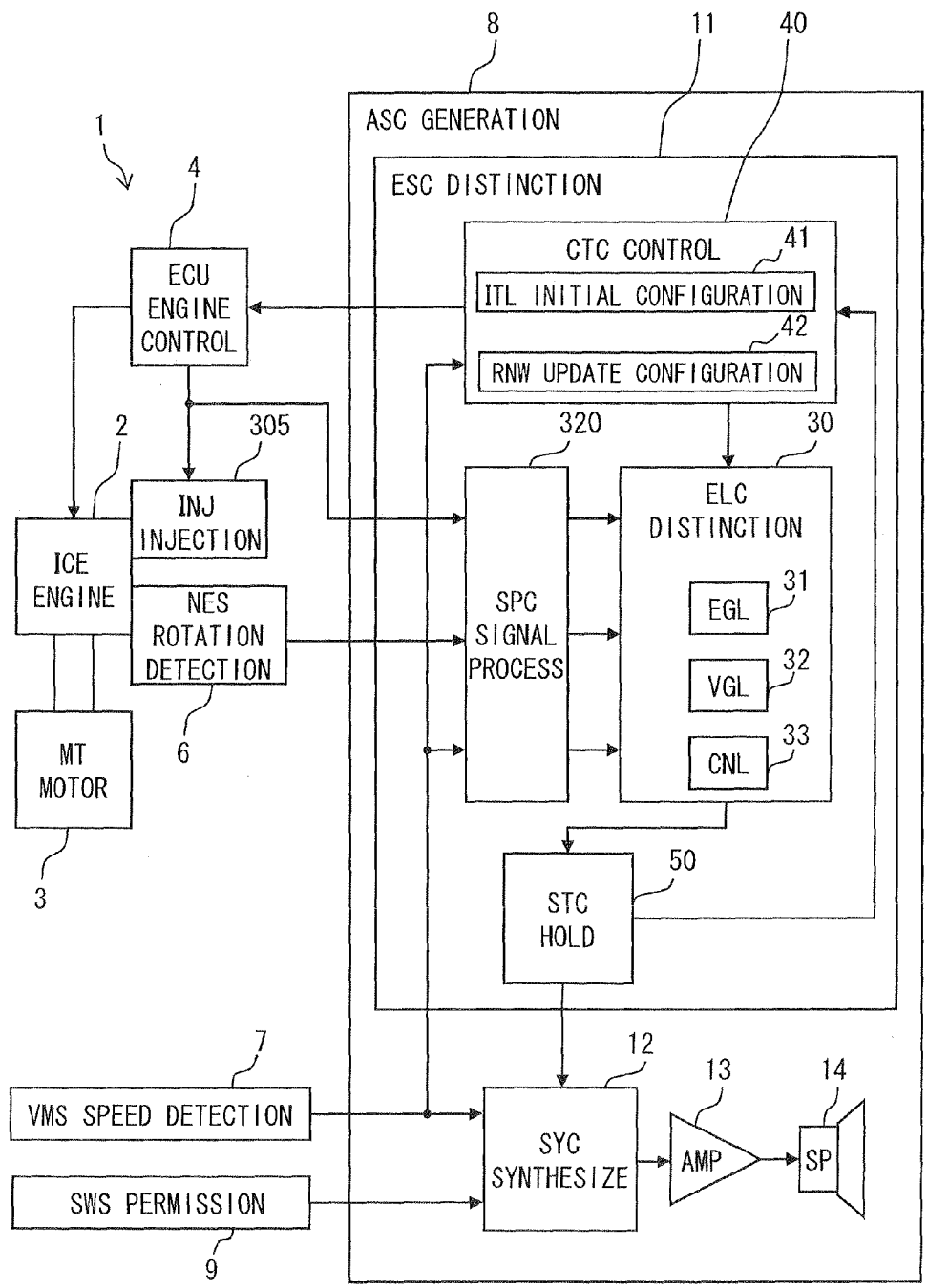
FIG. 8 is a block diagram showing a vehicular system including a generator circuit for a travel notification sound according to the third embodiment.

FIG. 8 is a block diagram showing a vehicular system 1 including a generator circuit 8 as a travel notification sound generator device according to the third embodiment. The vehicle is equipped with an internal combustion engine (ICE) 2 and an electric motor (MT) 3. As follows, the internal combustion engine 2 is denoted by an engine 2. As follows, the electric motor 3 is denoted by a motor 3. The motor 3 is a motor alternator configured to function selectively as an electric motor or a generator. The motor 3 is an electric motor for traveling. The vehicle is configured to travel only with the motor 3 at least temporarily. The vehicles is a hybrid vehicle configured to use both the engine 2 and the motor 3 or to use one of the engine 2 and the motor 3, as a power source for traveling. When a predetermined condition is satisfied, the vehicle is configured to stop the engine 2 and to travel only with the motor 3. When the vehicle travels only with the motor 3, the vehicle causes relatively smaller noise, compared with a case where the engine 2 is in operation. In consideration of this, when the vehicle travels only with the motor 3, it is required to emit an operation notification sound for notifying people outside and inside the vehicle of the vehicle's traveling. In addition, in a state where the vehicle is ready to travel, the vehicle may emit an operation notification sound. In the present description, the term of "operation" may mean both a state where the vehicle is traveling and a state where the vehicle is traveling and the vehicle is ready to travel. The term of "operation notification sound" may be equivalent to "vehicle proximity sound," "proximity annunciation sound," or "proximity alarm" when being used in order to notify a pedestrian of proximity of the vehicle. Dissimilarly to a conventional horn buzzer or the like, the operation notification sound is continually emitted during the time when the vehicle travels at a predetermined low speed.

The vehicle is equipped with an engine-control electronic control unit (ECU) 4 for controlling the engine 2. The ECU 4 controls the engine 2 according to signals from multiple sensors. The ECU 4 is configured to control start and stop of the engine 2.

The engine 2 is further equipped with a rotation speed sensor (NES) 6 for detecting the rotation speed NE of the engine 2. The engine 2 is further equipped with a vehicle speed sensor (VMS) 7 for detecting the traveling speed VM of the vehicle.

The vehicular system 1 further includes a generator circuit (ASC) 8 for emitting the operation notification sound. The generator circuit 8 may not be a programmable microcomputer. The generator circuit 8 includes an analog circuitry for processing an analog signal and a logic circuitry for processing a digital signal. The generator circuit 8 may not have a storage area for a program and may include a circuit component, instead of the storage area, for storing or holding an internal distinction result. The generator circuit 8 may not execute a program to proceed with a processing sequentially and may be configured to implement a signal processing in line with a predetermined sequence logic.

The vehicular system 1 further includes a permission device (SWS) 9 configured to permit or prohibit emission of the operation notification sound. The permission device 9 is, for example, a switch device manipulated by a driver of the vehicle or anther electronic control unit equipped to the vehicle. For example, the permission device 9 may be configured to prohibit emission of the operation notification sound when the vehicle parks and to permit emission of the operation notification sound when the vehicle is in the operation state. In addition, when the driver of the vehicle desires to stop emission of the operation notification sound, the driver may manipulate the permission device 9 to prohibit emission of the operation notification sound.

The generator circuit 8 includes a distinction circuit (ESC) 11, a synthetic circuit (SYC) 12, an amplification circuit (AMP) 13, and a speaker (SP) 14. The distinction circuit (ESC) 11 may function as a vehicle rank distinction device. Specifically, the distinction circuit 11 is configured to estimate and to distinguish the feature of the engine 2 of the vehicle and/or the feature of the vehicle body. The feature of the engine 2 and/or the feature of the vehicle body may represent the rank of the vehicle (vehicle rank) or the vehicle rank. The vehicle rank may be categorized according to multiple indices, such as the classification of the vehicle, the size of the vehicle body, the shape of the vehicle body, the weight of the vehicle body, the classification of the engine 2, displacement (size) of the engine 2, and the number of cylinders of the engine 2. In the present description, the vehicle rank is categorized according to an index, which affects noise emitted when the vehicle travels with the engine 2. The vehicle rank may be categorized according to at least the number of cylinders of the engine 2. In the categorization of the vehicle rank, the displacement of the engine 2 may be further used in addition to the number of cylinders. In the categorization of the vehicle rank, the size of the vehicle body may be further used in addition to the number of cylinders. The vehicle rank, to which the vehicle belongs, may be selected from multiple vehicle ranks comprehensively according to multiple indices. For example, distinction may be made whether the vehicle is a popular car or a luxury car. In addition or alternatively, distinction may be made whether the vehicle body shape of the vehicle is that of a track or that of a passenger car.

The distinction circuit 11 is equipped with a signal processing circuit (SPC) 320, a distinction logic circuit (ELC) 30, a control circuit (CTC) 40, and a hold circuit (STC) 50. The distinction logic circuit 30 determines the signal level of an input signal according to a predetermined rule and outputs a signal according to its determination result. The control circuit 40 is equipped with an initial configuration circuit (ITL) 41 and an update set circuit (RNW) 42. The initial configuration circuit (ITL) 41 causes the distinction logic circuit 30 to start the first processing. The update set circuit (RNW) 42 causes the distinction logic circuit 30 to repeat activation of the processing in order to enhance the accuracy of its distinction. The update set circuit 42 is configured to activate the distinction circuit 11 on determination that the vehicle travels at a speed exceeding a predetermined speed, according to a vehicle speed signal. When the vehicle travels at a speed exceeding the predetermined threshold Vth, it is considered that the engine 2 is in the predetermined relatively stable operation state. When the vehicle reaches such a stable traveling state, the update set circuit 42 updates a vehicle rank signal, which is held in the hold circuit 50, and implements a processing for enhancing the distinction accuracy.

The synthetic circuit 12 synthesizes a sound signal used for emitting the operation notification sound. Specifically, the synthetic circuit 12 synthesizes the sound signal used for emitting the operation notification sound similar to a noise of the engine 2 equipped in the vehicle. The sound signal is outputted from the synthetic circuit 12 and is amplified with the amplification circuit 13. The speaker 14 converts the sound signal amplified with the amplification circuit 13 into an actual sound and emits the operation notification sound. The speaker 14 emits the sound mainly to the exterior of the vehicle. The speaker 14 also emits the sound partially into the interior of the vehicle.

The vehicle rank signal outputted from the distinction circuit 11 is inputted into the synthetic circuit 12. The synthetic circuit 12 outputs a sound signal modulated according to the vehicle rank signal thereby to emit the operation notification sound with a tone according to the vehicle rank signal sent from the distinction circuit 11. With the present configuration, the synthetic circuit outputs the sound signal with a tone according to the vehicle rank. For example, it is assumed that the vehicle rank signal includes the number of cylinders of the engine 2. In this case, the synthetic circuit may output the sound signal with a tone including a periodic large fluctuation when the number of cylinders is small or may output the sound signal with a smooth tone including a small fluctuation when the number of cylinders is large. Alternatively or in addition, it is assumed that the vehicle rank signal includes the displacement (size) of the engine 2. In this case, the synthetic circuit may output the sound signal at a high frequency when the displacement of the engine 2 is small or may output the sound signal at a low frequency when the displacement of the engine 2 is large. Alternatively or in addition, it is assumed that the vehicle rank signal includes the vehicle size. In this case, the synthetic circuit may output the sound signal at a high frequency when the vehicle size is small or may output the sound signal at a low frequency when the vehicle size is large. Alternatively or in addition, it is assumed that the vehicle rank signal includes a luxury of the vehicle. In this case, the synthetic circuit may output the sound signal with a light tone at a high frequency when the vehicle is a popular car or may output the sound signal with a massive tone when the vehicle is a luxury car. Alternatively or in addition, it is assumed that the vehicle rank signal includes a purpose of the vehicle. In this case, the synthetic circuit may output the sound signal with a silent and smooth tone when the vehicle is a passenger car or may output the sound signal with a loud and fluctuating tone when the vehicle is a track.

The vehicle speed signal, which represents the traveling speed of the vehicle, is inputted from the vehicle speed sensor 7 into the synthetic circuit 12. The synthetic circuit 12 outputs the sound signal modulated further according to the vehicle speed thereby to emit the operation notification sound with a tone according to the vehicle speed. For example, the sound signal is synthesized to increase the frequency of the operation notification sound and to increase the sound volume of the operation notification sound, as the vehicle speed increases. The synthetic circuit 12 stops output of the sound signal when the vehicle speed VM becomes greater than or equal to a predetermined threshold speed.

A signal for permitting or prohibiting emission of the operation notification sound is inputted from the permission device 9 into the synthetic circuit 12. The synthetic circuit 12 stops output of the sound signal when the permission device 9 prohibits emission of the operation notification sound.

The distinction logic circuit 30 outputs the vehicle rank signal, which is a distinction result representing the distinguished vehicle rank, to the hold circuit 50. The hold circuit 50 holds the vehicle rank signal. The hold circuit 50 sends the vehicle rank signal, which is currently being held, to the synthetic circuit 12 and the control circuit 40. The hold circuit 50 may be, for example, a storage device or a flip-flop circuit. The hold circuit 50 is supplied with electricity from a vehicle battery to hold the vehicle rank signal after the vehicle is set in the parking state and operation of the vehicle is terminated by deactivating an electric power switch. In this way, the hold circuit 50 holds the vehicle rank signal until the subsequent distinction. With the present configuration, the operation notification sound can be emitted according to the vehicle rank signal held by the hold circuit 50 immediately after subsequent activation of the generator circuit 8.

The engine 2 is equipped with a fuel injection valve (INJ) 305. The fuel injection valve 305 supplies fuel for caused combustion in the engine 2. The fuel injection valve 305 is driven in synchronization with combustion caused in the engine 2 in order to operate the engine 2. The fuel injection valve 305 is driven to inject fuel according to a control signal sent from the ECU 4. Thus, the ECU 4 controls the fuel injection valve 305 to implement fuel injection in synchronization with combustion caused in the engine 2. In the present configuration, the control signal sent from the ECU 4 to the fuel injection valve 305 is for controlling combustion caused in the engine 2.

Figure 9:
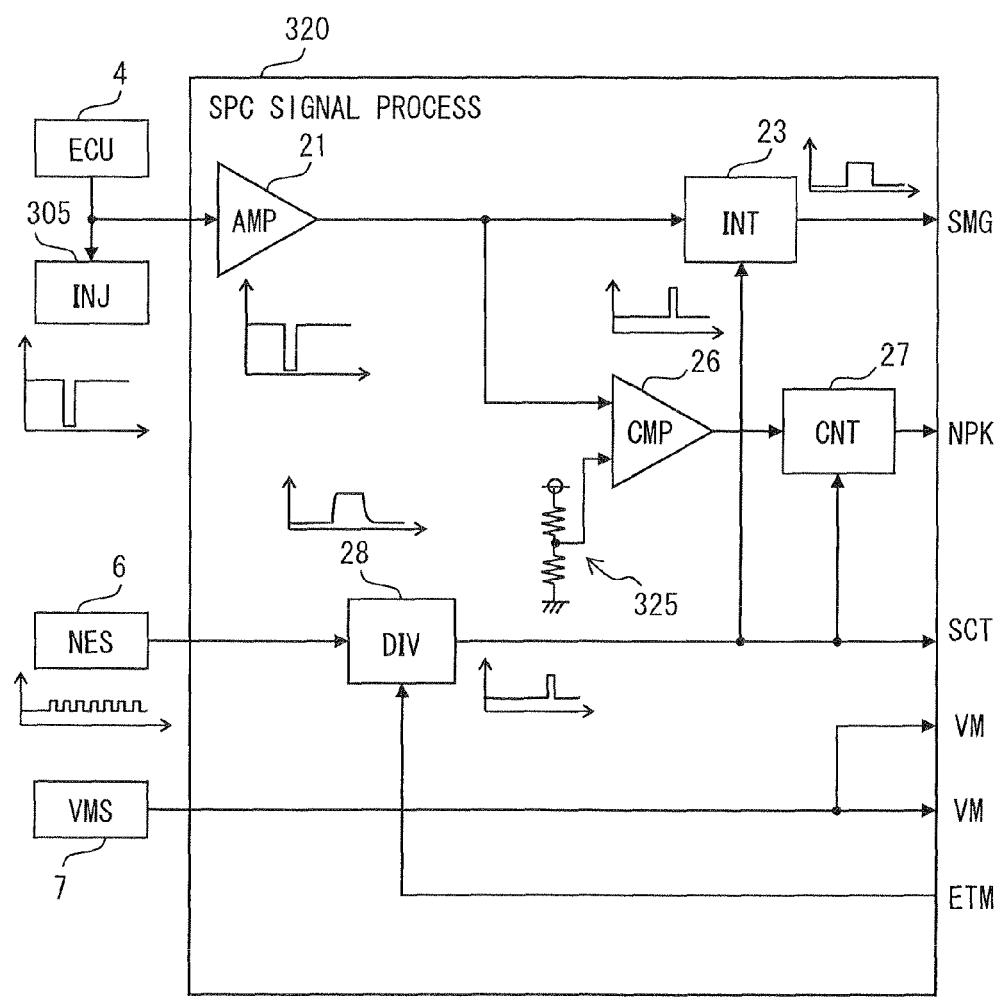
FIG. 9 is a block diagram showing a signal processing circuit according to the third embodiment.

FIG. 9 is a block diagram showing the signal processing circuit 320 of the third embodiment. The signal processing circuit 320 includes an amplification circuit (AMP) 21 configured to amplify a fuel injection signal, which is the control signal sent from the ECU 4 to the fuel injection valve 305. The control signal outputted from the amplification circuit 21 may be equivalent to a signal for distinction. The signal processing circuit 320 is equipped with an integration circuit (INT) 23. The integration circuit 23 integrates the signals for distinction over a vehicle rank distinction time period, which will be described later. The integration circuit 23 integrates the signals for distinction over the predetermined time period thereby to obtain a signal representing an fuel injection quantity, in other words, the intensity of combustion caused in the engine 2. Thus, the integration circuit 23 outputs a signal (SMG) representing the magnitude of the signal for distinction. The signal SMG is an integral value of multiple signals for distinction in a time period in which the engine 2 rotates by a predetermined number. In this way, the integration circuit 23 integrates the fuel injection signals in the time period, in which the engine 2 rotates by the predetermined number, and outputs the intensity signal SMG representing the intensity of the combustion. The intensity signal SMG is utilized to distinguish the category of the engine 2.

The signal processing circuit 320 is further equipped with comparison circuits 325, 26. The comparison circuits 325, 26 include a resistance voltage divider circuit 325 and a comparator circuit 26. The resistance voltage divider circuit 325 divides a constant voltage with the resistor elements thereby to set a reference voltage. The comparator circuit 26 compares the fuel injection signal with the reference voltage and outputs pulse signals according to the comparison result. Thus, the comparison circuits 325, 26 convert the fuel injection signal into the pulse signals to distinguish the number of cylinders.

The signal processing circuit 320 is further equipped with a counter circuit (CNT) 27 to count the number of the pulse signals outputted from the comparison circuits 325, 26. The counter circuit 27 counts the pulse signals over the vehicle rank distinction time period, which will be described later. The vehicle rank distinction time period corresponds a time period in which the engine 2 rotates by a predetermined number. Therefore, a count value of the counter circuit 27 corresponds to the number of fuel injection signals in the time period in which the engine 2 rotates by the predetermined number. The count value may be equivalent to the number fuel injection signals or a frequency of combustion. In this way, the counter circuit 27 counts the fuel injection signals in the time period, in which the engine 2 rotates by the predetermined number, and outputs a frequency signal NPK representing the frequency of combustion. The frequency signal NPK is utilized to distinguish the number of cylinders of the engine 2.

The signal processing circuit 320 is equipped with a frequency divider circuit (DIV) 28, which implements frequency division on the rotation speed signal inputted from the rotation speed sensor 6. The frequency divider circuit 28 implements the frequency division on the rotation speed signal according to a distinction time set signal (ETM). The distinction time set signal (ETM) is for setting a monitor time period in which the signal is monitored to distinguish the vehicle rank. A frequency-divided rotation speed signal is set as the vehicle rank distinction time period used in a distinction processing based on the signal for distinction. The vehicle rank distinction time period is set such that the engine 2 completes its rotation for a predetermined number within a predetermined time period. In this way, the distinction is made according to the signals for distinction in multiple rotations. Consequently, the distinction is made according the average thereby to enhance its accuracy. The output of the frequency divider circuit 28 is inputted as the vehicle rank distinction time period into the integration circuit 23 and the counter circuit 27. The output of the frequency divider circuit 28 may be equivalent to a distinction cycle signal (SCT) representing the cycle of the rotation speed signal.

Figure 10:
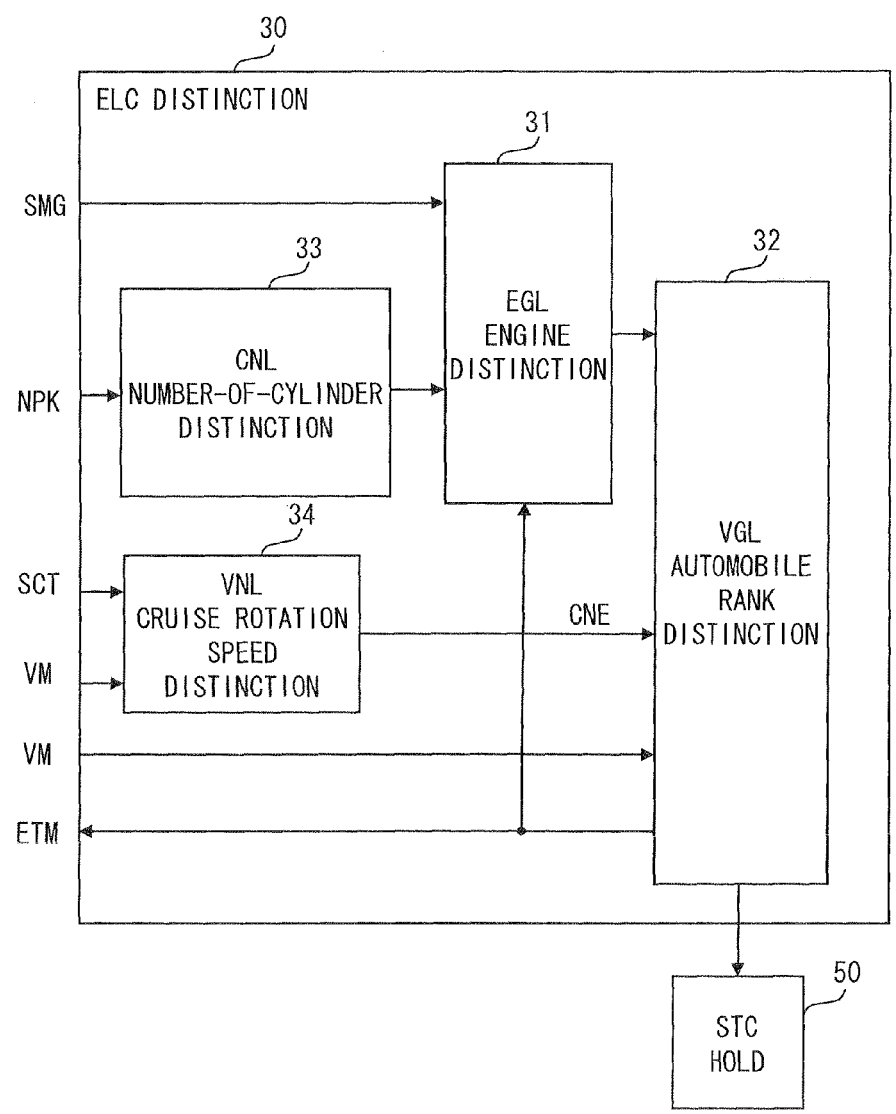
FIG. 10 is a block diagram showing a distinction logic circuit according to the third embodiment.

FIG. 10 is a block diagram showing the distinction logic circuit 30 of the third embodiment. The distinction logic circuit 30 is equipped with an engine distinction circuit (EGL) 31, a vehicle rank distinction circuit (VGL) 32, a number-of-cylinder distinction circuit (CNL) 33, and a cruise rotation speed distinction circuit (VNL) 34. The engine distinction circuit 31 distinguishes an engine category including the displacement of the engine 2. The vehicle rank distinction circuit 32 distinguishes the vehicle rank. The number-of-cylinder distinction circuit 33 distinguishes the number of cylinders of the engine 2. Specifically, the number-of-cylinder distinction circuit 33 distinguishes the number of cylinders of the engine 2 according to the frequency signal NPK in the time period in which the engine 2 rotates by the predetermined number.

The cruise rotation speed distinction circuit 34 detects the rotation speed of the engine 2 when the vehicle travels at a specific vehicle speed. Specifically, the cruise rotation speed distinction circuit 34 detects the rotation speed of the engine 2, as a cruise rotation speed CNE, when the vehicle travels at a cruising speed. The rotation speed of the engine 2 when the vehicle travels at the specific speed reflects the output power of the engine 2 and the weight of the vehicle. Specifically, for example, a small-size car having a small-displacement engine requires a high rotation speed of the engine 2 in order to travel on a highway. To the contrary, a large-size car having a large-displacement engine is capable of traveling on a highway with a relatively low rotation speed of the engine 2. Accordingly, the cruise rotation speed is used as one of the indices for distinguishing the vehicle rank.

The vehicle rank distinction circuit 32 outputs the distinction time set signal ETM for setting the frequency dividing ratio of the frequency divider circuit 28. Therefore, the frequency dividing ratio of the frequency divider circuit 28 is variable. In this case, when the vehicle rank signal is not held in the hold circuit 50 and when the vehicle rank signal is required immediately, the frequency divider circuit 28 sets the frequency dividing ratio to enable the distinction in a short time period. Alternatively, the frequency dividing ratio may be set to increase the distinction time period in order to obtain an average value from a large number of signals thereby to enhance the distinction accuracy. With the present configuration, the accuracy and the distinction time period of the vehicle rank distinction can be set arbitrarily according to an object to distinct. The vehicle rank distinction circuit 32 sets the signal ETM to cause a short distinction time period in an initial configuration made by the initial configuration circuit 41. The vehicle rank distinction circuit 32 further sets the signal ETM to cause a long distinction time period when the update set circuit 42 implements an update configuration. Consequently, the time period for monitoring the signal for distinction and the time period for monitoring the rotation speed signal in order to determine the vehicle rank become variable. With the present configuration, when the distinction result has not been obtained yet, the distinction time period may be shortened thereby to implement early distinction. To the contrary, when the distinction result is already obtained, the distinction time period may be increased thereby to implement distinction with high accuracy. In the present configuration, the vehicle rank distinction circuit 32 may function as an adjustment circuit for adjusting a monitoring time period for controlling the amount of information of the signals for distinction for distinguishing the vehicle rank.

Figure 11:
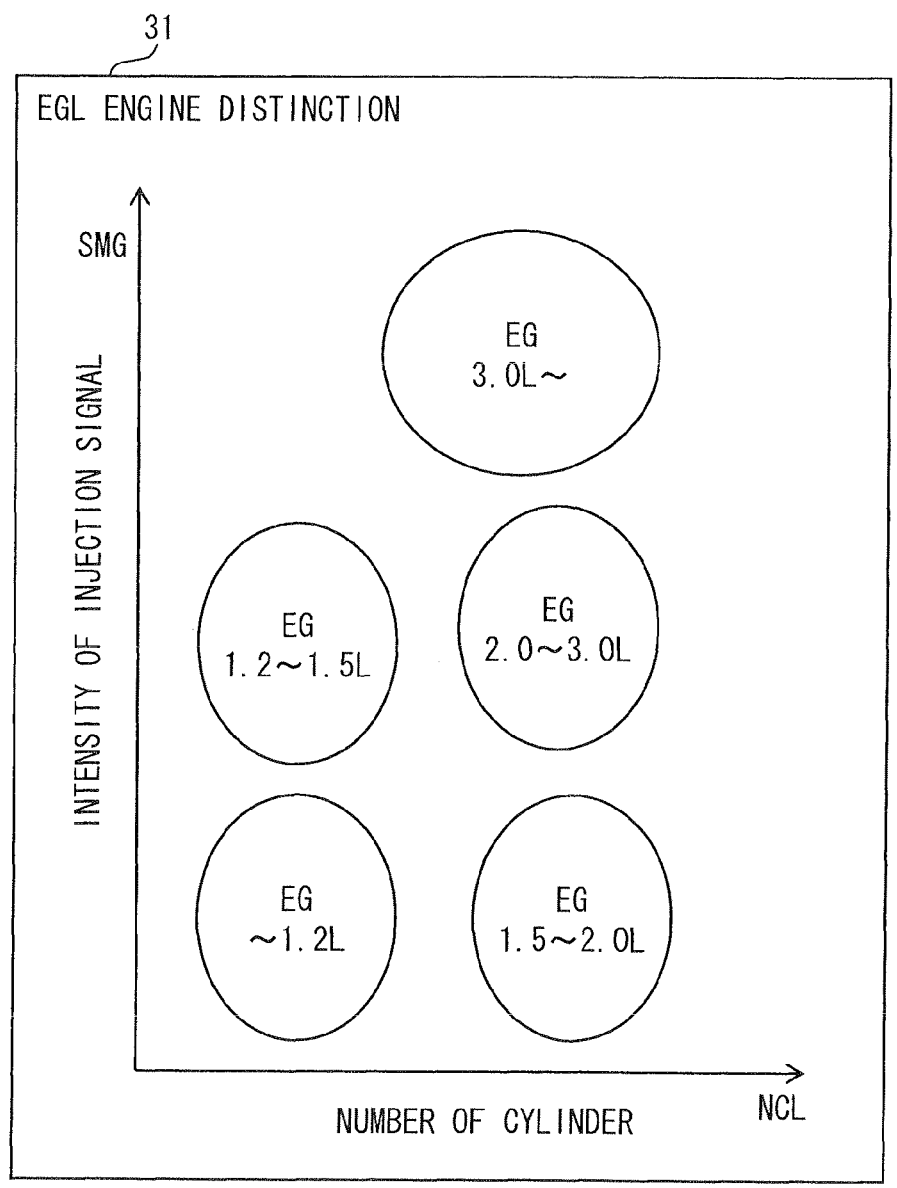
FIG. 11 is a classification view showing a distinction function of the engine distinction circuit according to the third embodiment.

FIG. 11 is a classification view showing a distinction function of the engine distinction circuit 31 of the third embodiment. The engine distinction circuit 31 distinguishes the category of the engine 2 including the displacement of the engine 2, according to the intensity signal SMG and the number of cylinders NCL of the engine 2 outputted from the number-of-cylinder distinction circuit 33. In other words, the engine distinction circuit 31 distinguishes the engine displacement according to the intensity signal SMG and the number of cylinders NCL. The distinction function may be set such that, for example, the displacement increases as the intensity signal SMG increases, and/or the displacement increases as the number of cylinders NCL increases.

Figure 12:
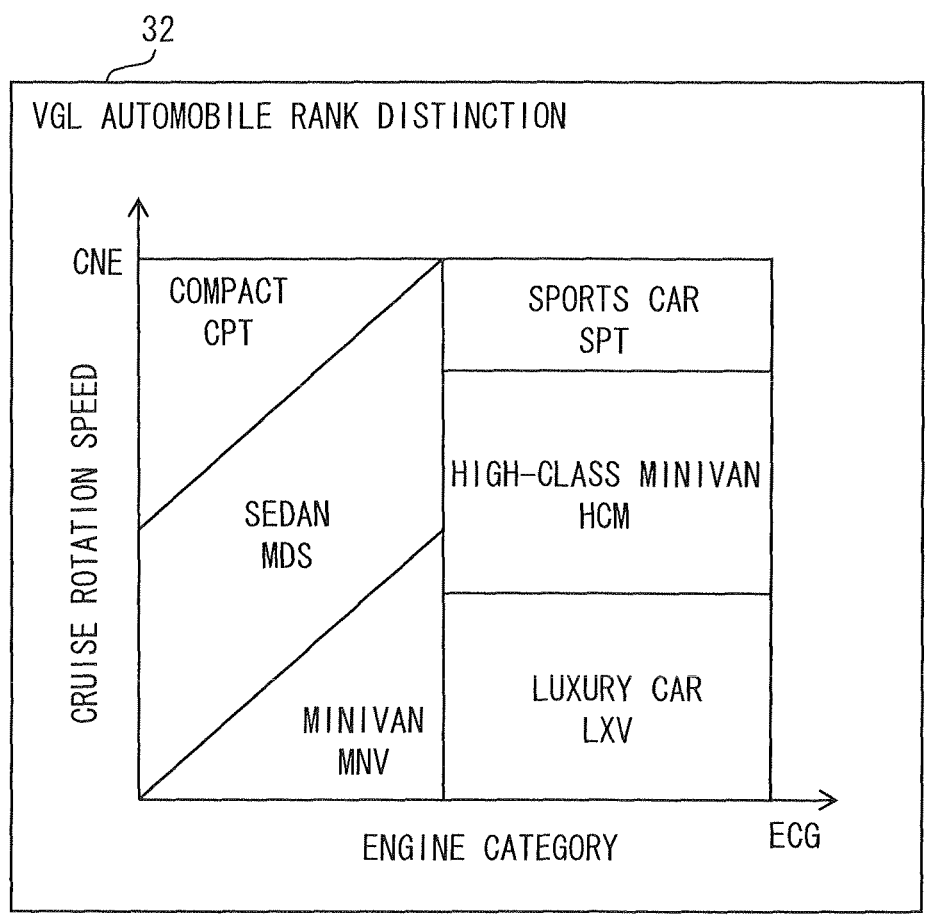
FIG. 12 is a classification view showing a distinction function of a vehicle rank distinction circuit according to the third embodiment.

FIG. 12 is a classification view showing a distinction function of the vehicle rank distinction circuit 32 of the third embodiment. The vehicle rank distinction circuit 32 distinguishes the vehicle rank according to a category ECG (i.e., displacement) of the engine 2 distinguished with the engine distinction circuit 31 and the cruise rotation speed CNE calculated with the cruise rotation speed distinction 34. The vehicle rank distinction circuit 32 distinguishes the vehicle rank from a compact car (CPT), a medium-size sedan (MDS), a minivan (MNV), a sports car (SPT), a high-class minivan (HCM), and a luxury car (LXV). The category ECG of the engine 2 is classified into multiple regions for distinction of the vehicle rank. In the present embodiment, the category ECG of the engine 2 is classified into two regions of a small and middle displacement region and a large displacement region. The cruise rotation speed CNE is classified into multiple regions for distinction of the vehicle rank. The cruise rotation speed CNE in the small and middle displacement region is classified into three regions of a high-rotation speed region, a middle-rotation speed region, and a low-rotation speed region. Specifically, the compact car is assigned to the high-rotation speed region, the medium-size sedan is assigned to the middle-rotation speed region, and the minivan is assigned to the low-rotation speed region. In the small and middle displacement region, each of the boundary lines between vehicle ranks is set to incline upward and rightward such that the cruise rotation speed CNE increases as the displacement increases. The cruise rotation speed CNE in the large displacement region is classified into three regions of a high-rotation speed region, a middle-rotation speed region, and a low-rotation speed region. Specifically, the sports car is assigned to the high-rotation speed region, the high-class minivan is assigned to the middle-rotation speed region, and the luxury car is assigned to the low-rotation speed region. In the large displacement region, each of the boundary lines between vehicle ranks is set laterally such that the cruise rotation speed CNE is substantially constant as the displacement increases.

Figure 13:
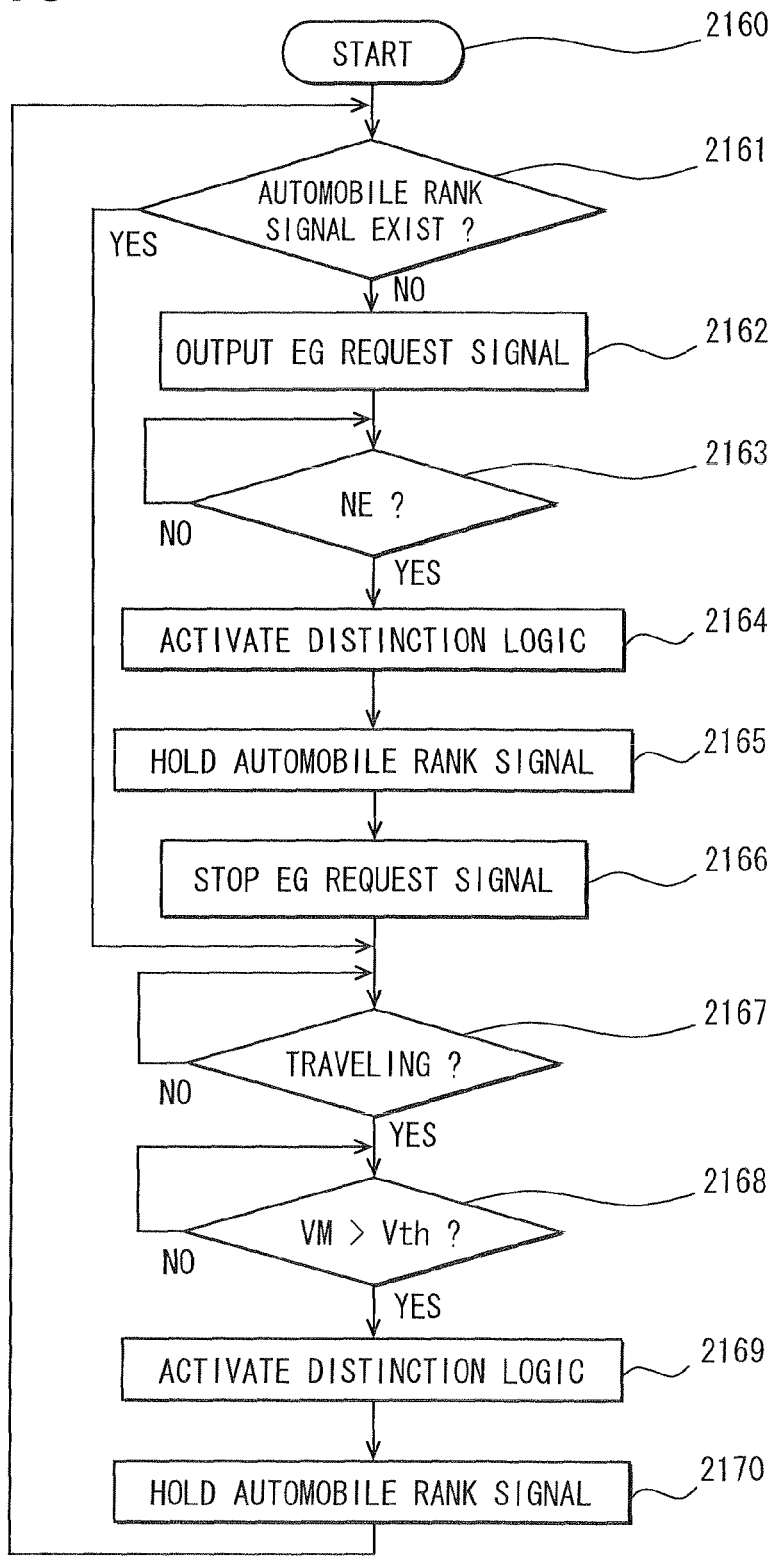
FIG. 13 is a flow chart showing a processing according to the third embodiment.

FIG. 13 is a flow chart showing an operation of the generator circuit 8 of the third embodiment. It is noted that, although the flow chart shows an operation sequence, the generator circuit 8 may not be a microcomputer. FIG. 13 shows a sequence logic of the operation of the generator circuit 8.

The operation starts from step 2160 when the power source of the generator circuit 8 is activated. As follows, a case where the generator circuit 8 is equipped to the vehicle for the first time and supplied with electricity from the vehicle battery for the first time will be described. At step 2161, it is determined whether the signal representing the vehicle rank is held normally in the hold circuit 50. Immediately after activation of the generator circuit 8 for the first time, the hold circuit 50 does not hold the vehicle rank signal. Therefore, the processing proceeds to step 2162. Alternatively, when the vehicle rank signal is held in the hold circuit 50, the processing proceeds to step 2166.

At step 2162, the generator circuit 8 outputs an engine operation request signal to the ECU 4. In response to the signal, the ECU 4 starts the engine 2, and thereby the engine 2 establishes an operative state of the vehicle. At step 2163, it is determined whether the engine 2 rotates and whether the rotation speed signal NE is detected. When the rotation speed signal NE is detected, the processing proceeds to step 2164. At step 2164, the distinction logic circuit 30 is activated. Thereby, the vehicle rank is distinguished, and the vehicle rank signal is outputted. At step 2165, the vehicle rank signal is held in the hold circuit 50. At step 2166, output of the engine operation request signal is stopped. Thereby, the ECU 4 determines the control state of the engine 2 and stops the engine 2. Subsequently, the synthetic circuit 12 synthesizes the sound signal for emitting the operation notification sound according to the vehicle rank signal held in the hold circuit 50 and outputs the sound signal. The processing of steps 2161-2166 is implemented with the initial configuration circuit 41.

At step 2167, it is determined whether the vehicle is shifted into the traveling state in which the vehicle uses the engine 2 as a power source while operating the engine 2. When the vehicle is shifted into the traveling state in which the vehicle is driven with the engine 2, the processing proceeds to step 2168. At step 2168, it is determined whether the vehicle speed VM exceeds the predetermined threshold Vth. When the vehicle speed VM exceeds the threshold Vth, the processing proceeds to step 2169. When the vehicle travels at a speed exceeding the predetermined threshold Vth, it is considered that the engine 2 is in the predetermined relatively stable operation state. When the vehicle reaches such a stable traveling state, the generator circuit 8 updates the vehicle rank signal, which is held in the hold circuit 50, and implements the processing for enhancing the distinction accuracy. At step 2169, the distinction logic circuit 30 is activated. Thereby, the vehicle rank is distinguished, and a new vehicle rank signal is outputted. At step 2170, the new vehicle rank signal is held in the hold circuit 50. Consequently, the vehicle rank signal held in the hold circuit 50 is updated. The synthetic circuit 12 synthesizes the sound signal for emitting the operation notification sound according to the vehicle rank signal held in the hold circuit 50 and outputs the sound signal. The processing of steps 2167-2170 is implemented with the update set circuit 42.

Subsequent to step 2170, the processing returns to step 2161 again. The vehicle rank signal held in the hold circuit 50 may be lost due to malfunction of the hold circuit 50 or due to malfunction of the power source. In addition or alternatively, the information held in the hold circuit 50 may be crashed to cause a state where a normal vehicle rank signal is not held. In such a case, the processing from step 2161 to step 2170 is implemented again to reset the vehicle rank signal.

With the configuration according to the present embodiment, the category of the engine 2 and/or the category of the vehicle body can be, distinguished according to the signal for distinction reflecting the combustion state of the engine 2. In addition, the operation notification sound is emitted with a tone according to the distinction result. Consequently, the operation notification sound suitable for the vehicle can be emitted. In addition, the generator circuit 8 distinguishes the category of the engine 2 and/or the category of the vehicle body. Therefore, even when the generator circuit 8 is applied to a different vehicle, the operation notification sound can be emitted according to the vehicle. That is, the operation notification sound can be emitted with one hard configuration of the generator circuit 8 adaptively to various displacements and various vehicle ranks of vehicles. Accordingly, it is not necessary to prepare multiple products suited for multiple vehicle ranks. Thus, cost reduction can be enabled by mass production. Furthermore, the operation notification sound can be emitted with a tone according to the vehicle rank, with a low cost hardware configuration, which does not include a microcomputer.

More specifically, the generator circuit 8 distinguishes at least the number of cylinders of the engine 2 and emits the operation notification sound with a tone according to the distinguished number of cylinders. Accordingly, the generator circuit 8 is enabled to emit the operation notification sound without significant uncomfortable feeling.

In addition, according to the present embodiment, the displacement of the engine 2 is distinguished, and the operation notification sound is emitted with a tone according to the distinguished number of cylinders. Accordingly, the generator circuit 8 is enabled to emit the operation notification sound without significant uncomfortable feeling.

In addition, according to the present embodiment, the rotation speed of the engine 2 when the vehicle travels at the specific vehicle speed is distinguished, and the vehicle rank is distinguished according to the distinguished rotation speed of the engine 2. Furthermore, the operation notification sound is emitted with a tone according to the distinguished vehicle rank. With the present configuration, the generator circuit 8 emits the operation notification sound reflecting features such as the size of the vehicle, the weight of the vehicle, and the type of the vehicle. Accordingly, the generator circuit 8 is enabled to emit the operation notification sound without significant uncomfortable feeling.

Furthermore, in the present embodiment, when there is no initial value of the vehicle rank signal for emitting the operation notification sound, the signal is outputted to require the operation of the engine 2. In this way, the vehicle rank can be distinguished at an early stage, and thereby, the operation notification sound can be emitted according to the vehicle rank at an early stage.

(Fourth Embodiment)

Figure 14:
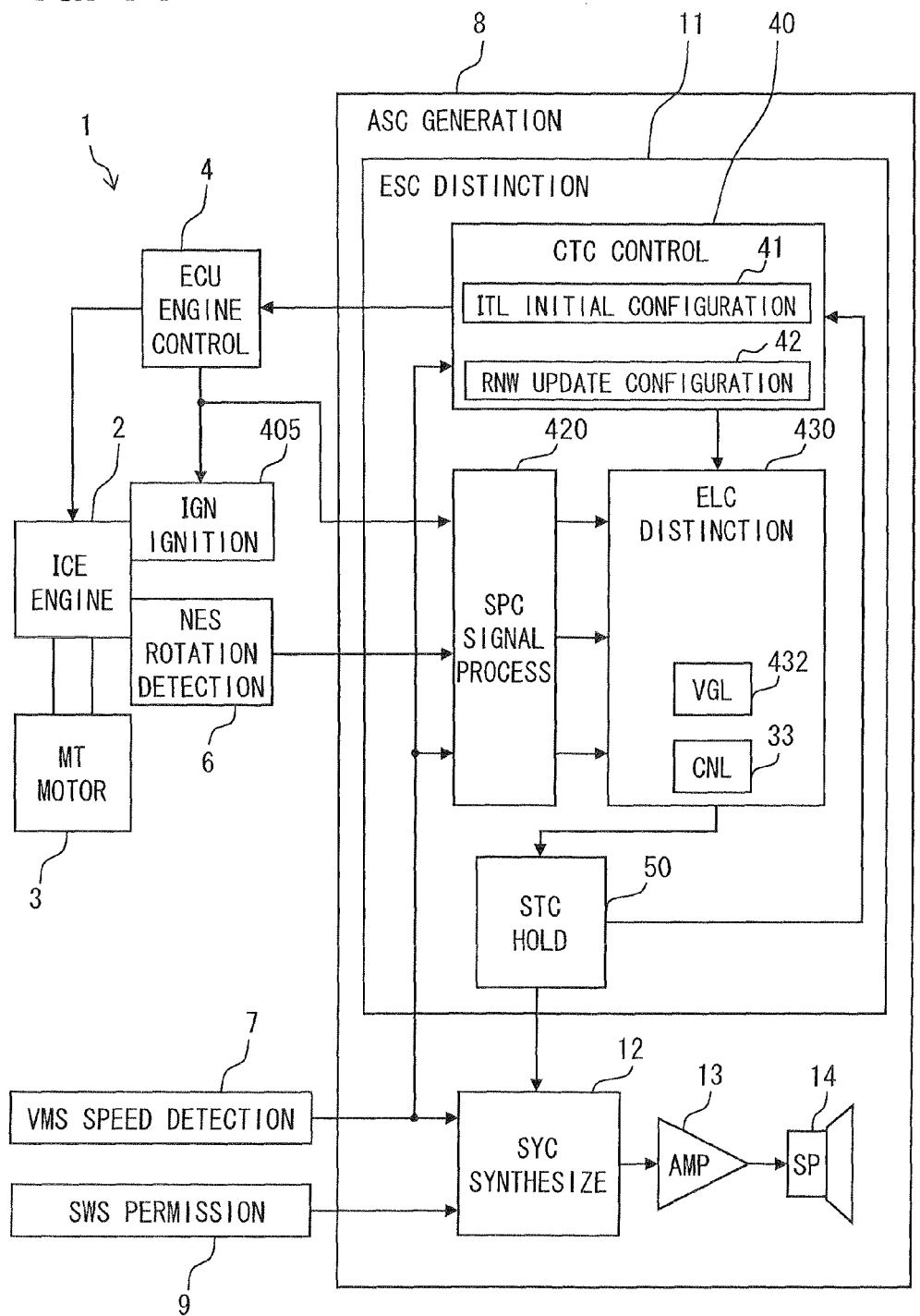
FIG. 14 is a block diagram showing a vehicular system including a generator circuit for a travel notification sound according to the fourth embodiment.

FIG. 14 is a block diagram showing a vehicular system 1 including the generator circuit 8 for the travel notification sound according to the fourth embodiment. In the above embodiments, the generator circuit 8 inputs the control signal sent to the fuel injection valve 305. In addition or alternatively, the generator circuit 8 may input a control signal sent to an igniter 405, as the signal for distinction. In the present embodiment, the generator circuit 8 inputs an ignition signal sent from the ECU 4 for engine control to the igniter 405.

The igniter 405 is driven in synchronization with combustion caused in the engine 2 in order to operate the engine 2. The igniter 405 is driven to ignite air-fuel mixture in a combustion chamber according to a control signal sent from the ECU 4. Thus, the ECU 4 controls the igniter 405 to ignite air-fuel mixture in synchronization with combustion caused in the engine 2. The ignition signal represents at least an ignition timing. The ignition signal may represent an amount of ignition energy caused with the igniter.

In the present embodiment, the distinction circuit 11 is equipped with a signal processing circuit (SPC) 420 and a distinction logic circuit (ELC) 430. The distinction logic circuit 430 is equipped with a vehicle rank distinction circuit 432 and the number-of-cylinder distinction circuit 33.

Figure 15:
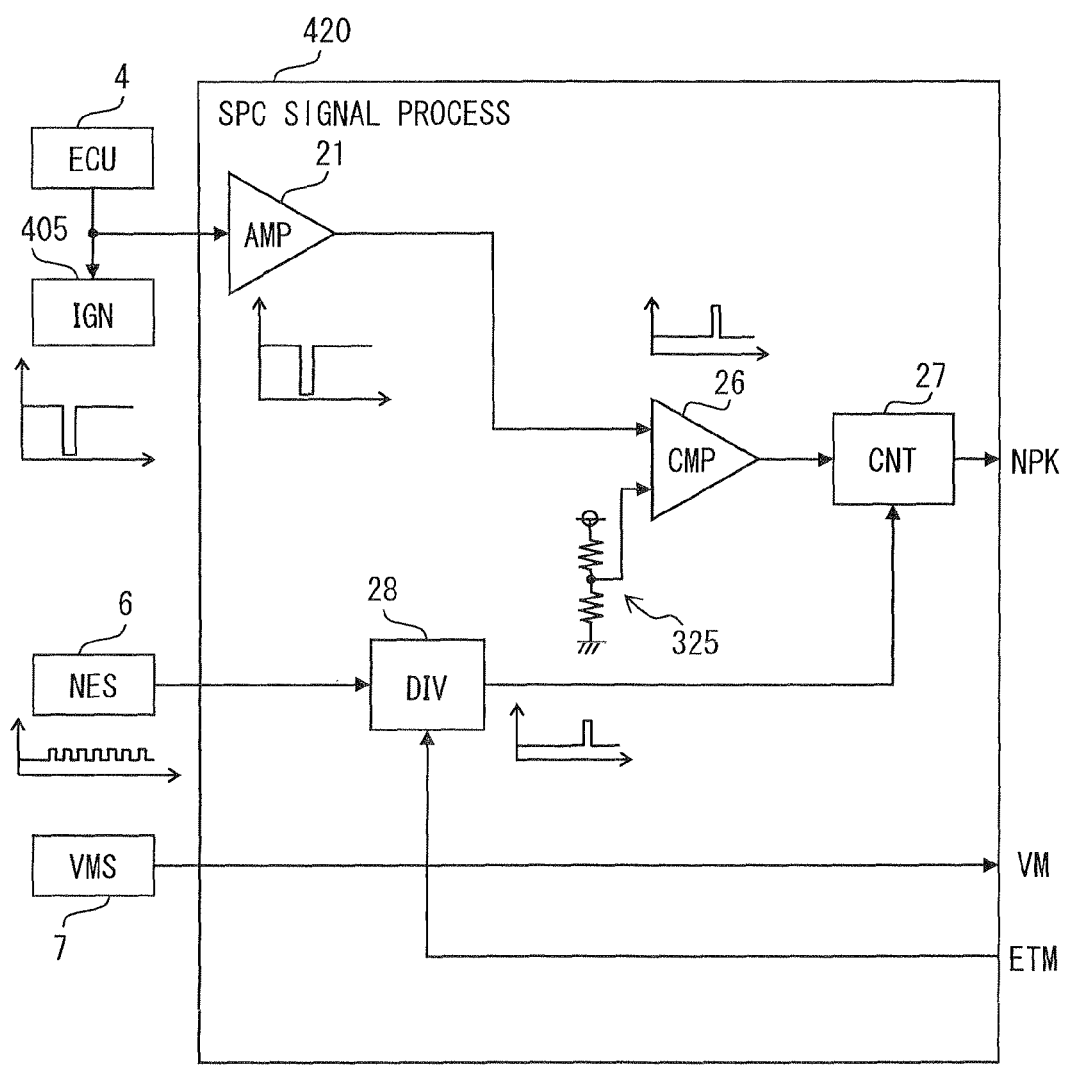
FIG. 15 is a block diagram showing a signal processing circuit according to the fourth embodiment.
Figure 16:
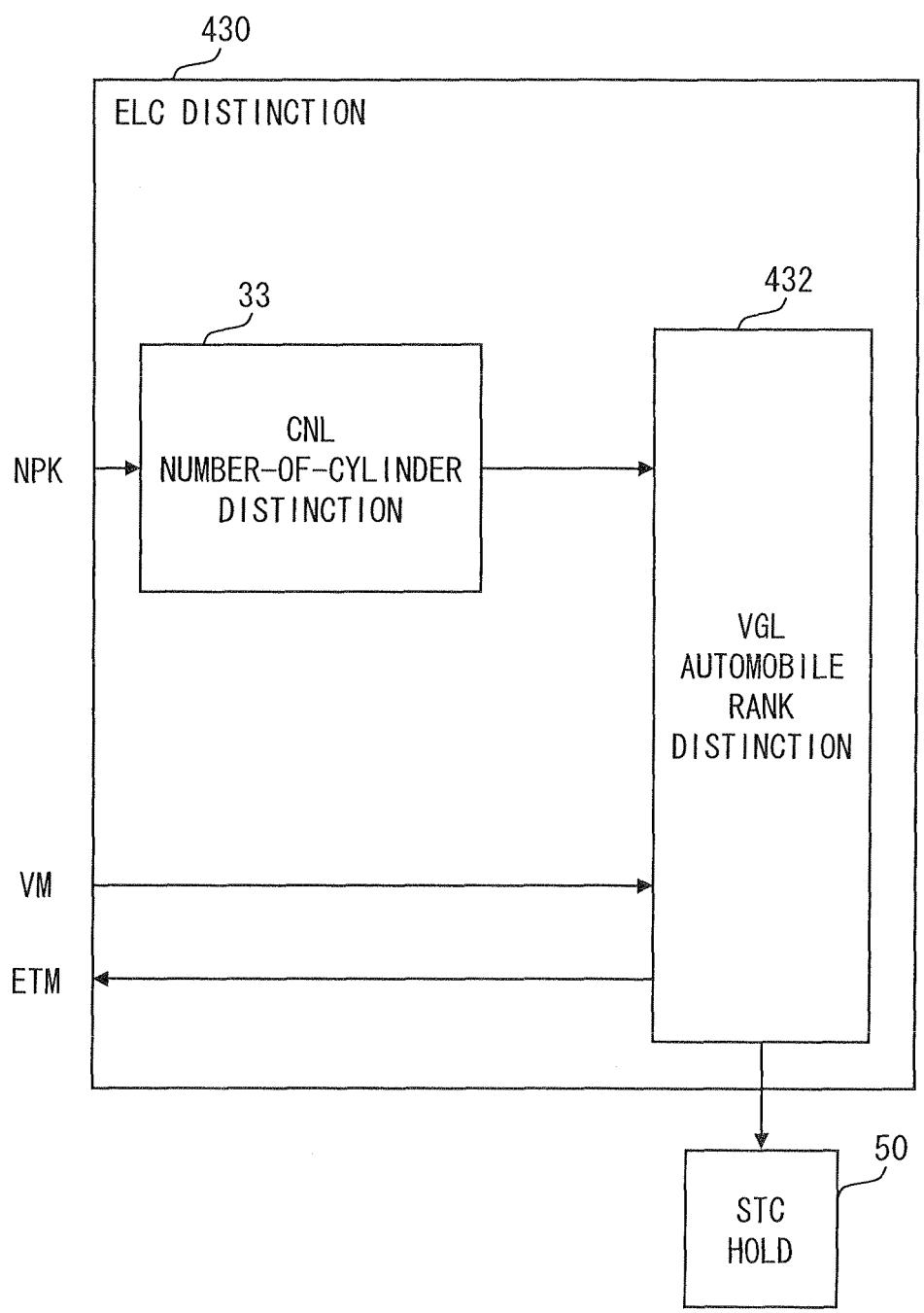
FIG. 16 is a block diagram showing a distinction logic circuit according to the fourth embodiment.

FIG. 15 is a block diagram showing the signal processing circuit 420 of the fourth embodiment. The signal processing circuit 420 includes an amplification circuit (AMP) 21 configured to amplify an ignition signal, which is the control signal sent from the ECU 4 to the igniter 405. In the present embodiment, the signal for distinction outputted from the amplification circuit 21 is converted into pulse signals with the comparison circuits 325, 26 and is counted with the counter circuit 27. The frequency divider circuit 28 implements the frequency division on the rotation speed signal according to a distinction time set signal (ETM). The distinction time set signal (ETM) is for setting a monitor time period in which the signal is monitored to distinguish the vehicle rank. In this way, the counter circuit 27 counts the ignition signals in the time period, in which the engine 2 rotates by the predetermined number, and outputs a frequency signal NPK representing the frequency of combustion. In the present embodiment, the integration circuit 23 and related circuits are not equipped. Accordingly, the intensity signal SMG is not obtained in the present embodiment.

FIG. 14 is a block diagram showing the distinction logic circuit 430 of the fourth embodiment. The distinction logic circuit 430 is equipped with a vehicle rank distinction circuit (VGL) 432 and the number-of-cylinder distinction circuit (CNL) 33. The vehicle rank distinction circuit 32 distinguishes the vehicle rank. The number-of-cylinder distinction circuit 33 distinguishes the number of cylinders of the engine 2. Specifically, the number-of-cylinder distinction circuit 33 distinguishes the number of cylinders of the engine 2 according to the frequency signal NPK in the time period in which the engine 2 rotates by the predetermined number.

In the present embodiment, the vehicle rank distinction circuit 432 distinguishes the vehicle rank mainly according to the number of cylinders distinguished with the number-of-cylinder distinction circuit 33 and outputs the vehicle rank signal. The vehicle rank distinction circuit 432 further outputs the distinction time set signal ETM for setting the frequency dividing ratio of the frequency divider circuit 28.

(Other Embodiment)

As described above, the embodiments of the present invention have been described. It is noted that, the present invention is not limited to the above embodiments. The present invention may be variously modified and may be in practical use in a sprit of the present invention. The configurations of the embodiments are examples and do not limit the present invention in these descriptions. The present invention includes various modifications.

For example, in the above embodiments, the synthetic circuit 12 outputs the sound signal modulated according to the vehicle speed VM and the vehicle rank signal. Alternatively, the synthetic circuit 12 may be equipped with a storage unit for storing multiple sound signals and a selection unit for selecting one sound signal from multiple sound signals according to the vehicle speed VM. Alternatively or in addition, the synthetic circuit 12 may be equipped with a selection unit for selecting one sound signal from multiple sound signals according to the vehicle rank signal. The synthetic circuit 12 may electrically switch a target value for synthesizing the sound signal according to the vehicle rank signal when the vehicle travels with the motor 3 thereby to determine the tone of the sound signal according to the vehicle rank in a hardware manner.

In the above embodiments, the hold circuit 50 holds the vehicle rank signal being the distinction result. Alternatively, the vehicle rank signal may be held in a storage device of another control device or in a storage device used for another function. A circuit element may be provided to hold an analog value of the signal for distinction, instead of the vehicle rank signal being the distinction result, thereby to enable to obtain quickly the distinction result in subsequent activation of the device.

In addition to the embodiments or alternatively to the embodiments, a circuit may be equipped for activating the distinction circuit 11 on determination that the vehicle stops according to the vehicle speed signal (VM=0). More specifically, the condition at step 2168 may be replaced to "VM=0?" In this case, the distinction circuit 11 distinguishes the vehicle rank according to the signal for distinction, when the vehicle stops and is in an idling state. In this way, fluctuation caused in the distinction result, when the vehicle travels in a particular environment such as a rough road, can be removed.

In the above embodiments, the fuel injection signal or the ignition signal is used as the control signal. Alternatively, both the fuel injection signal and the ignition signal may be used.

In the above embodiments, the distinction logic circuit 30 includes the engine distinction circuit 31, the vehicle rank distinction circuit 32, the number-of-cylinder distinction circuit 33, and the cruise rotation speed distinction circuit 34 in order to distinguish the vehicle rank comprehensively according to the number of cylinders, the displacement of the engine, and the cruise rotation speed. Alternatively, the distinction logic circuit 30 may distinguish the vehicle rank according to only the number of cylinders or only the displacement of the engine, or according to a combination of the number of cylinders and the displacement of the engine, a combination of the number of cylinders and the cruise rotation speed, or a combination of the displacement of the engine and the cruise rotation speed.

In the above embodiments, the generator circuit 8 is caused to output the operation request signal of the engine 2 to the ECU 4. The generator circuit 8, in general, may have an output terminal for diagnoses, and in this case, the output terminal for diagnoses may be used as an output terminal of the operation request signal. With the present configuration, a terminal and an I/O circuit need not be provided for exclusive use of the operation request signal. Consequently, manufacturing cost can be reduced.

(Fifth Embodiment)

Figure 17:
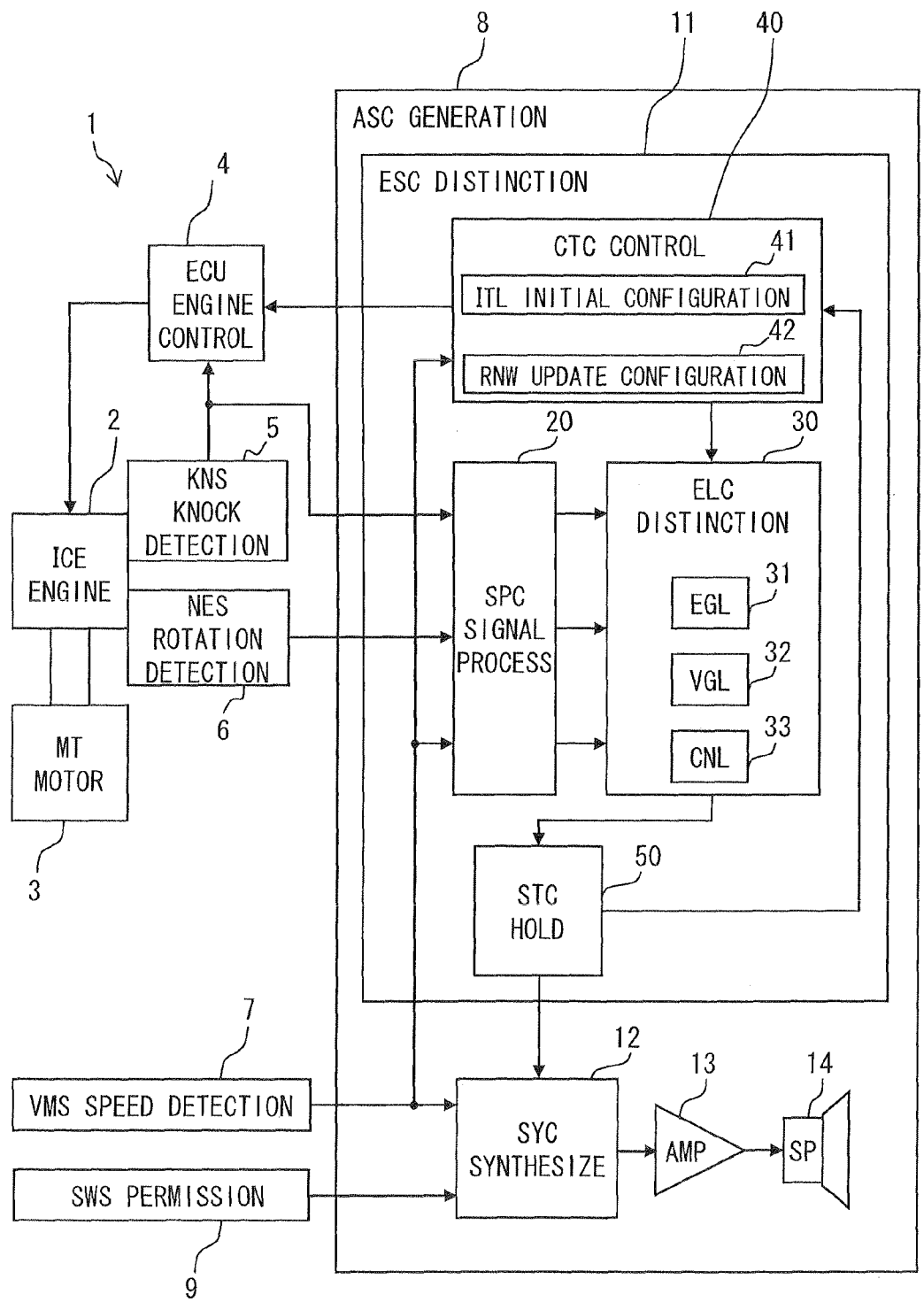
FIG. 17 is a block diagram showing a vehicular system including a generator circuit for a travel notification sound according to the fifth embodiment.

FIG. 17 is a block diagram showing a vehicular system 1 including a generator circuit 8 as a travel sound generator device according to the fifth embodiment. The vehicle is equipped with an internal combustion engine (ICE) 2 and an electric motor (MT) 3. As follows, the internal combustion engine 2 is denoted by an engine 2. As follows, the electric motor 3 is denoted by a motor 3. The motor 3 is a motor alternator configured to function selectively as an electric motor or a generator. The motor 3 is an electric motor for traveling. The vehicle is configured to travel only with the motor 3 at least temporarily. The vehicles is a hybrid vehicle configured to use both the engine 2 and the motor 3 or to use one of the engine 2 and the motor 3, as a power source for traveling. When a predetermined condition is satisfied, the vehicle is configured to stop the engine 2 and to travel only with the motor 3. When the vehicle travels only with the motor 3, the vehicle causes relatively smaller noise, compared with a case where the engine 2 is in operation. In consideration of this, when the vehicle travels only with the motor 3, it is required to emit an operation notification sound for notifying people outside and inside the vehicle of the vehicle's traveling. In addition, in a state where the vehicle is ready to travel, the vehicle may emit an operation notification sound. In the present description, the term of "operation" may mean both a state where the vehicle is traveling and a state where the vehicle is traveling and the vehicle is ready to travel. The term of "operation notification sound" may be equivalent to "vehicle proximity sound," "proximity annunciation sound," or "proximity alarm" when being used in order to notify a pedestrian of proximity of the vehicle. Dissimilarly to a conventional horn buzzer or the like, the operation notification sound is continually emitted during the time when the vehicle travels at a predetermined low speed.

The vehicle is equipped with an engine-control electronic control unit (ECU) 4 for controlling the engine 2. The ECU 4 controls the engine 2 according to signals from multiple sensors. The ECU 4 is configured to control start and stop of the engine 2.

The engine 2 is further equipped with a rotation speed sensor (NES) 6 for detecting the rotation speed NE of the engine 2. The engine 2 is further equipped with a vehicle speed sensor (VMS) 7 for detecting the traveling speed VM of the vehicle.

The vehicular system 1 further includes a generator circuit (ASC) 8 for emitting the operation notification sound. The generator circuit 8 may not be a programmable microcomputer. The generator circuit 8 includes an analog circuitry for processing an analog signal and a logic circuitry for processing a digital signal. The generator circuit 8 may not have a storage area for a program and may include a circuit component, instead of the storage area, for storing or holding an internal distinction result. The generator circuit 8 may not execute a program to proceed with a processing sequentially and may be configured to implement a signal processing in line with a predetermined sequence logic.

The vehicular system 1 further includes a permission device (SWS) 9 configured to permit or prohibit emission of the operation notification sound. The permission device 9 is, for example, a switch device manipulated by a driver of the vehicle or anther electronic control unit equipped to the vehicle. For example, the permission device 9 may be configured to prohibit emission of the operation notification sound when the vehicle parks and to permit emission of the operation notification sound when the vehicle is in the operation state. In addition, when the driver of the vehicle desires to stop emission of the operation notification sound, the driver may manipulate the permission device 9 to prohibit emission of the operation notification sound.

The generator circuit 8 includes a distinction circuit (ESC) 11, a synthetic circuit (SYC) 12, an amplification circuit (AMP) 13, and a speaker (SP) 14. The distinction circuit (ESC) 11 may function as a vehicle rank distinction device. Specifically, the distinction circuit 11 is configured to estimate and to distinguish the feature of the engine 2 of the vehicle and/or the feature of the vehicle body. The feature of the engine 2 and/or the feature of the vehicle body may represent the rank of the vehicle (vehicle rank) or the vehicle rank. The vehicle rank may be categorized according to multiple indices, such as the classification of the vehicle, the size of the vehicle body, the shape of the vehicle body, the weight of the vehicle body, the classification of the engine 2, displacement (size) of the engine 2, and the number of cylinders of the engine 2. In the present description, the vehicle rank is categorized according to an index, which affects noise emitted when the vehicle travels with the engine 2. The vehicle rank may be categorized according to at least the number of cylinders of the engine 2. In the categorization of the vehicle rank, the displacement of the engine 2 may be further used in addition to the number of cylinders. In the categorization of the vehicle rank, the size of the vehicle body may be further used in addition to the number of cylinders. The vehicle rank, to which the vehicle belongs, may be selected from multiple vehicle ranks comprehensively according to multiple indices. For example, distinction may be made whether the vehicle is a popular car or a luxury car. In addition or alternatively, distinction may be made whether the vehicle body shape of the vehicle is that of a track or that of a passenger car.

The distinction circuit 11 is equipped with a signal processing circuit (SPC) 20, a distinction logic circuit (ELC) 30, a control circuit (CTC) 40, and a hold circuit (STC) 50. The distinction logic circuit 30 determines the signal level of an input signal according to a predetermined rule and outputs a signal according to its determination result. The control circuit 40 is equipped with an initial configuration circuit (ITL) 41 and an update set circuit (RNW) 42. The initial configuration circuit (ITL) 41 causes the distinction logic circuit 30 to start the first processing. The update set circuit (RNW) 42 causes the distinction logic circuit 30 to repeat activation of the processing in order to enhance the accuracy of its distinction. The update set circuit 42 is configured to activate the distinction circuit 11 on determination that the vehicle travels at a speed exceeding a predetermined speed, according to a vehicle speed signal. When the vehicle travels at a speed exceeding the predetermined threshold Vth, it is considered that the engine 2 is in the predetermined relatively stable operation state. When the vehicle reaches such a stable traveling state, the update set circuit 42 updates a vehicle rank signal, which is held in the hold circuit 50, and implements a processing for enhancing the distinction accuracy.

The synthetic circuit 12 synthesizes a sound signal used for emitting the operation notification sound. Specifically, the synthetic circuit 12 synthesizes the sound signal used for emitting the operation notification sound similar to a noise of the engine 2 equipped in the vehicle. The sound signal is outputted from the synthetic circuit 12 and is amplified with the amplification circuit 13. The speaker 14 converts the sound signal amplified with the amplification circuit 13 into an actual sound and emits the operation notification sound. The speaker 14 emits the sound mainly to the exterior of the vehicle. The speaker 14 also emits the sound partially into the interior of the vehicle.

The vehicle rank signal outputted from the distinction circuit 11 is inputted into the synthetic circuit 12. The synthetic circuit 12 outputs a sound signal modulated according to the vehicle rank signal thereby to emit the operation notification sound with a tone according to the vehicle rank signal sent from the distinction circuit 11. With the present configuration, the synthetic circuit outputs the sound signal with a tone according to the vehicle rank. For example, it is assumed that the vehicle rank signal includes the number of cylinders of the engine 2. In this case, the synthetic circuit may output the sound signal with a tone including a periodic large fluctuation when the number of cylinders is small or may output the sound signal with a smooth tone including a small fluctuation when the number of cylinders is large. Alternatively or in addition, it is assumed that the vehicle rank signal includes the displacement (size) of the engine 2. In this case, the synthetic circuit may output the sound signal at a high frequency when the displacement of the engine 2 is small or may output the sound signal at a low frequency when the displacement of the engine 2 is large. Alternatively or in addition, it is assumed that the vehicle rank signal includes the vehicle size. In this case, the synthetic circuit may output the sound signal at a high frequency when the vehicle size is small or may output the sound signal at a low frequency when the vehicle size is large. Alternatively or in addition, it is assumed that the vehicle rank signal includes a luxury of the vehicle. In this case, the synthetic circuit may output the sound signal with a light tone at a high frequency when the vehicle is a popular car or may output the sound signal with a massive tone when the vehicle is a luxury car. Alternatively or in addition, it is assumed that the vehicle rank signal includes a purpose of the vehicle. In this case, the synthetic circuit may output the sound signal with a silent and smooth tone when the vehicle is a passenger car or may output the sound signal with a loud and fluctuating tone when the vehicle is a track.

The vehicle speed signal, which represents the traveling speed of the vehicle, is inputted from the vehicle speed sensor 7 into the synthetic circuit 12. The synthetic circuit 12 outputs the sound signal modulated further according to the vehicle speed thereby to emit the operation notification sound with a tone according to the vehicle speed. For example, the sound signal is synthesized to increase the frequency of the operation notification sound and to increase the sound volume of the operation notification sound, as the vehicle speed increases. The synthetic circuit 12 stops output of the sound signal when the vehicle speed VM becomes greater than or equal to a predetermined threshold speed.

A signal for permitting or prohibiting emission of the operation notification sound is inputted from the permission device 9 into the synthetic circuit 12. The synthetic circuit 12 stops output of the sound signal when the permission device 9 prohibits emission of the operation notification sound.

The distinction logic circuit 30 outputs the vehicle rank signal, which is a distinction result representing the distinguished vehicle rank, to the hold circuit 50. The hold circuit 50 holds the vehicle rank signal. The hold circuit 50 sends the vehicle rank signal, which is currently being held, to the synthetic circuit 12 and the control circuit 40. The hold circuit 50 may be, for example, a storage device or a flip-flop circuit. The hold circuit 50 is supplied with electricity from a vehicle battery to hold the vehicle rank signal after the vehicle is set in the parking state and operation of the vehicle is terminated by deactivating an electric power switch. In this way, the hold circuit 50 holds the vehicle rank signal until the subsequent distinction. With the present configuration, the operation notification sound can be emitted according to the vehicle rank signal held by the hold circuit 50 immediately after subsequent activation of the generator circuit 8.

The engine 2 is equipped with a knock sensor (KNS) 5. The knock sensor 5 detects oscillation, i.e., a knock, caused by combustion in the combustion chamber of the engine 2 and outputs an electric signal according to the detected oscillation. The knock sensor 5 is a combustion state sensor configured to detect the engine combustion state. The output signal of the knock sensor 5 is inputted into the ECU 4.

Figure 18:
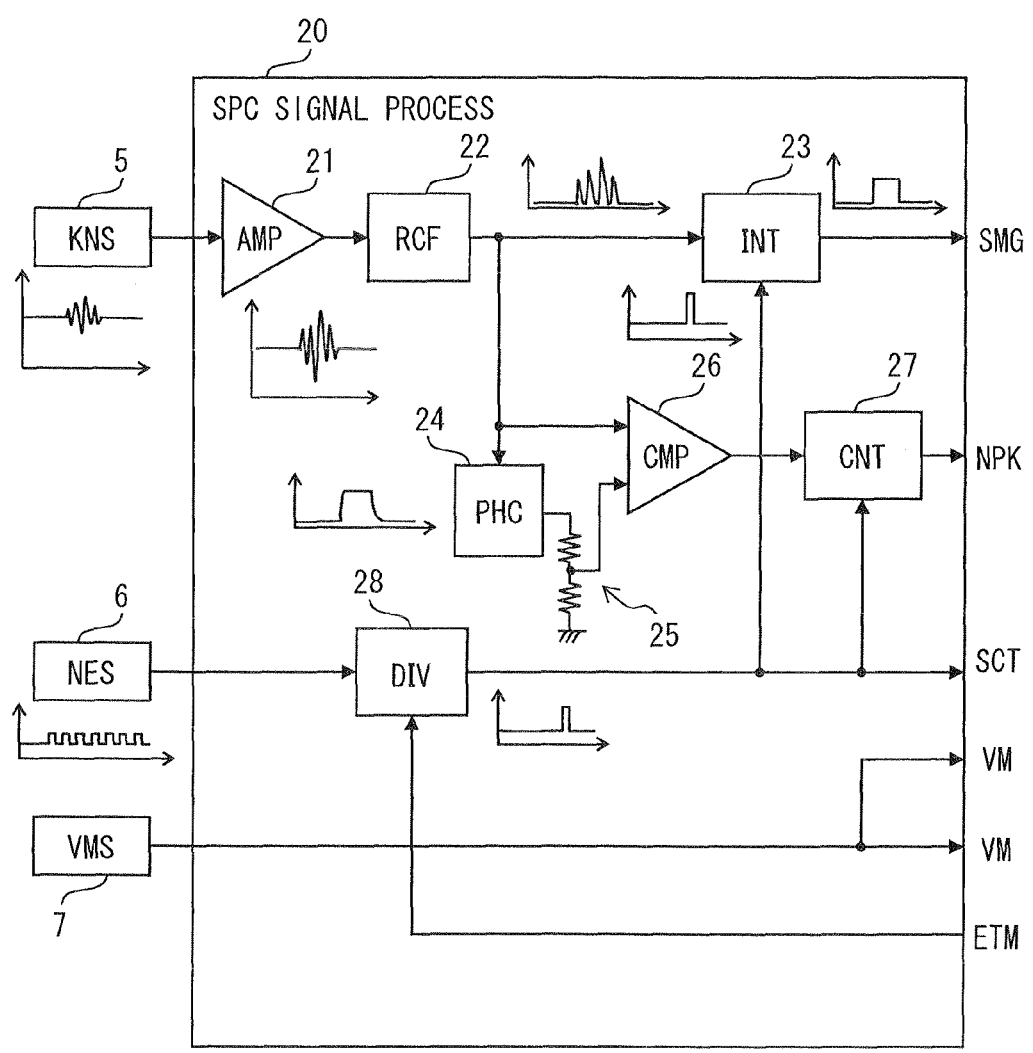
FIG. 18 is a block diagram showing a signal processing circuit according to the fifth embodiment.

FIG. 18 is a block diagram showing the signal processing circuit 20 of the fifth embodiment. The signal processing circuit 20 includes an amplification circuit (AMP) 21 and a rectification circuit (RCF) 22. The amplification circuit (AMP) 21 amplifies the knock signal sent from the knock sensor 5. The rectification circuit (RCF) 22 implements half-wave rectification on the amplified knock signal. The knock signal outputted from the rectification circuit 22 and implemented with the half-wave rectification may be equivalent to a signal for distinction. The signal processing circuit 20 is equipped with an integration circuit (INT) 23. The integration circuit 23 integrates the signals for distinction over a vehicle rank distinction time period, which will be described later. The integration circuit 23 integrates the signals for distinction over the predetermined time period thereby to obtain a signal representing the intensity and magnitude of knock, in other words, the intensity and magnitude of combustion caused in the engine 2. Thus, the integration circuit 23 outputs a signal (SMG) representing the magnitude of the signal for distinction. The signal SMG is an integral value of multiple signals for distinction in a time period in which the engine 2 rotates by a predetermined number. In this way, the integration circuit 23 integrates the knock signals in the time period, in which the engine 2 rotates by the predetermined number, and outputs the intensity signal SMG representing the intensity of the combustion. The intensity signal SMG is utilized to distinguish the category of the engine 2.

The signal processing circuit 20 is further equipped with comparison circuits 24, 25, 26. The comparison circuits 24, 25, 26 include a peak hold circuit (PHC) 24, a resistance voltage divider circuit 25, and a comparator circuit 26. The peak hold circuit 24 holds a peak value of the knock signal over a predetermined time period. The resistance voltage divider circuit 25 is equipped with resistor elements to divide the signal level held by the peak hold circuit 24 thereby to set a reference voltage. The comparator circuit 26 compares the knock signal with the reference voltage and outputs pulse signals according to the comparison result. Thus, the comparison circuits 24, 25, 26 convert the knock signal into the pulse signals to distinguish the number of cylinders.

The signal processing circuit 20 is further equipped with a counter circuit (CNT) 27 to count the number of the pulse signals outputted from the comparison circuits 24, 25, 26. The counter circuit 27 counts the pulse signals over the vehicle rank distinction time period, which will be described later. The vehicle rank distinction time period corresponds a time period in which the engine 2 rotates by a predetermined number. Therefore, a count value of the counter circuit 27 corresponds to the number of peaks of the knock signal in the time period in which the engine 2 rotates by the predetermined number. The count value may be equivalent to the number of peaks of the knock signal or a frequency of combustion. In this way, the counter circuit 27 counts the knock signals in the time period, in which the engine 2 rotates by the predetermined times, and outputs a frequency signal NPK representing the frequency of combustion. The frequency signal NPK is utilized to distinguish the number of cylinders of the engine 2.

The signal processing circuit 20 is equipped with a frequency divider circuit (DIV) 28, which implements frequency division on the rotation speed signal inputted from the rotation speed sensor 6. The frequency divider circuit 28 implements the frequency division on the rotation speed signal according to a distinction time set signal (ETM). The distinction time set signal (ETM) is for setting a monitor time period in which the signal is monitored to distinguish the vehicle rank. A frequency-divided rotation speed signal is set as the vehicle rank distinction time period used in a distinction processing based on the signal for distinction. The vehicle rank distinction time period is set such that the engine 2 completes its rotation for a predetermined number within a predetermined time period. In this way, the distinction is made according to the signals for distinction in multiple rotations. Consequently, the distinction is made according the average thereby to enhance its accuracy. The output of the frequency divider circuit 28 is inputted as the vehicle rank distinction time period into the integration circuit 23 and the counter circuit 27. The output of the frequency divider circuit 28 may be equivalent to a distinction cycle signal (SCT) representing the cycle of the rotation speed signal.

Figure 19:
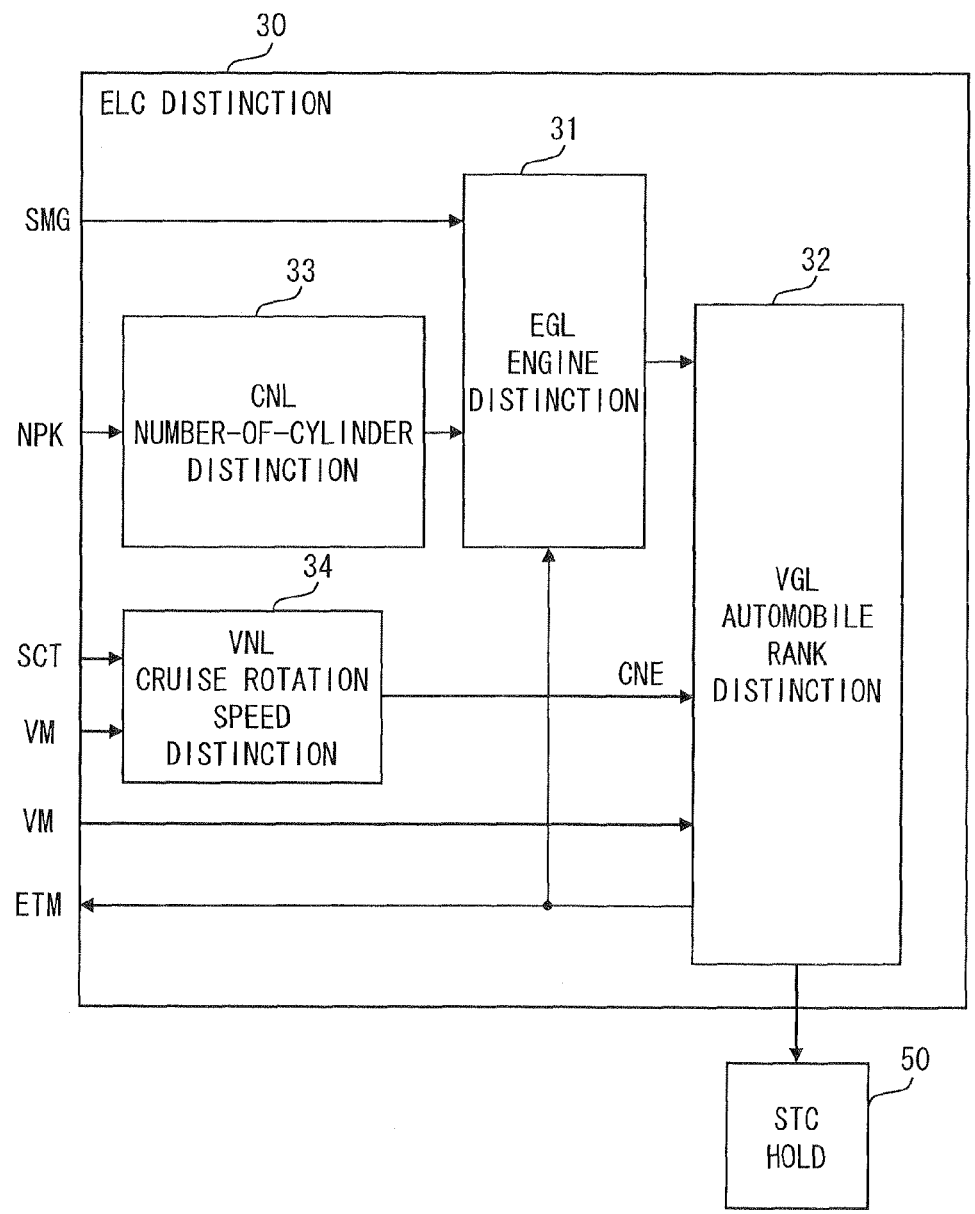
FIG. 19 is a block diagram showing a distinction logic circuit according to the fifth embodiment.

FIG. 19 is a block diagram showing the distinction logic circuit 30 of the fifth embodiment. The distinction logic circuit 30 is equipped with an engine distinction circuit (EGL) 31, a vehicle rank distinction circuit (VGL) 32, a number-of-cylinder distinction circuit (CNL) 33, and a cruise rotation speed distinction circuit (VNL) 34. The engine distinction circuit 31 distinguishes an engine category including the displacement of the engine 2. The vehicle rank distinction circuit 32 distinguishes the vehicle rank. The number-of-cylinder distinction circuit 33 distinguishes the number of cylinders of the engine 2. Specifically, the number-of-cylinder distinction circuit 33 distinguishes the number of cylinders of the engine 2 according to the frequency signal NPK in the time period in which the engine 2 rotates by the predetermined number.

The cruise rotation speed distinction circuit 34 detects the rotation speed of the engine 2 when the vehicle travels at a specific vehicle speed. Specifically, the cruise rotation speed distinction circuit 34 detects the rotation speed of the engine 2, as a cruise rotation speed CNE, when the vehicle travels at a cruising speed. The rotation speed of the engine 2 when the vehicle travels at the specific speed reflects the output power of the engine 2 and the weight of the vehicle. Specifically, for example, a small-size car having a small-displacement engine requires a high rotation speed of the engine 2 in order to travel on a highway. To the contrary, a large-size car having a large-displacement engine is capable of traveling on a highway with a relatively low rotation speed of the engine 2. Accordingly, the cruise rotation speed is used as one of the indices for distinguishing the vehicle rank.

The vehicle rank distinction circuit 32 outputs the distinction time set signal ETM for setting the frequency dividing ratio of the frequency divider circuit 28. Therefore, the frequency dividing ratio of the frequency divider circuit 28 is variable. In this case, when the vehicle rank signal is not held in the hold circuit 50 and when the vehicle rank signal is required immediately, the frequency divider circuit 28 sets the frequency dividing ratio to enable the distinction in a short time period. Alternatively, the frequency dividing ratio may be set to increase the distinction time period in order to obtain an average value from a large number of signals thereby to enhance the distinction accuracy. With the present configuration, the accuracy and the distinction time period of the vehicle rank distinction can be set arbitrarily according to an object to distinct. The vehicle rank distinction circuit 32 sets the signal ETM to cause a short distinction time period in an initial configuration made by the initial configuration circuit 41. The vehicle rank distinction circuit 32 further sets the signal ETM to cause a long distinction time period when the update set circuit 42 implements an update configuration. Consequently, the time period for monitoring the signal for distinction and the time period for monitoring the rotation speed signal in order to determine the vehicle rank become variable. With the present configuration, when the distinction result has not been obtained yet, the distinction time period may be shortened thereby to implement early distinction. To the contrary, when the distinction result is already obtained, the distinction time period may be increased thereby to implement distinction with high accuracy. In the present configuration, the vehicle rank distinction circuit 32 may function as an adjustment circuit for adjusting a monitoring time period for controlling the amount of information of the signals for distinction for distinguishing the vehicle rank.

Figure 20:
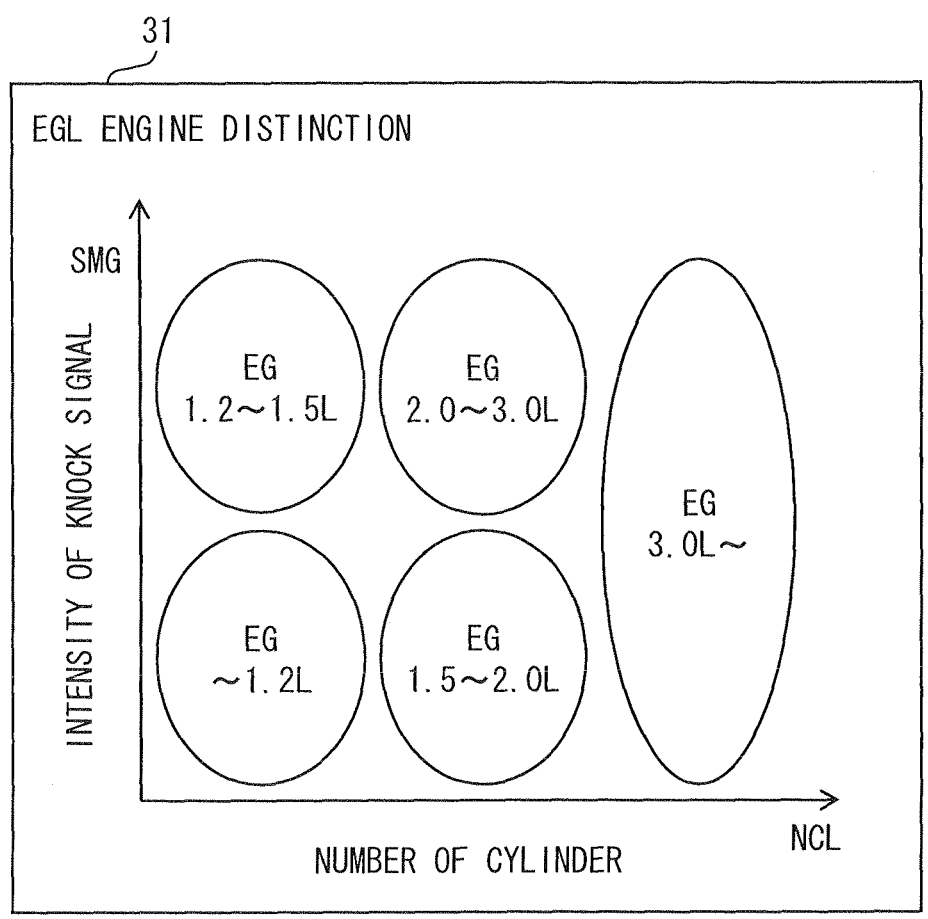
FIG. 20 is a classification view showing a distinction function of the engine distinction circuit according to the fifth embodiment.

FIG. 20 is a classification view showing a distinction function of the engine distinction circuit 31 of the fifth embodiment. The engine distinction circuit 31 distinguishes the category of the engine 2 including the displacement of the engine 2, according to the intensity signal SMG and the number of cylinders NCL of the engine 2 outputted from the number-of-cylinder distinction circuit 33. In other words, the engine distinction circuit 31 distinguishes the engine displacement according to the intensity signal SMG and the number of cylinders NCL. The distinction function may be set such that, for example, the displacement increases as the intensity signal SMG increases, and/or the displacement increases as the number of cylinders NCL increases.

Figure 21:
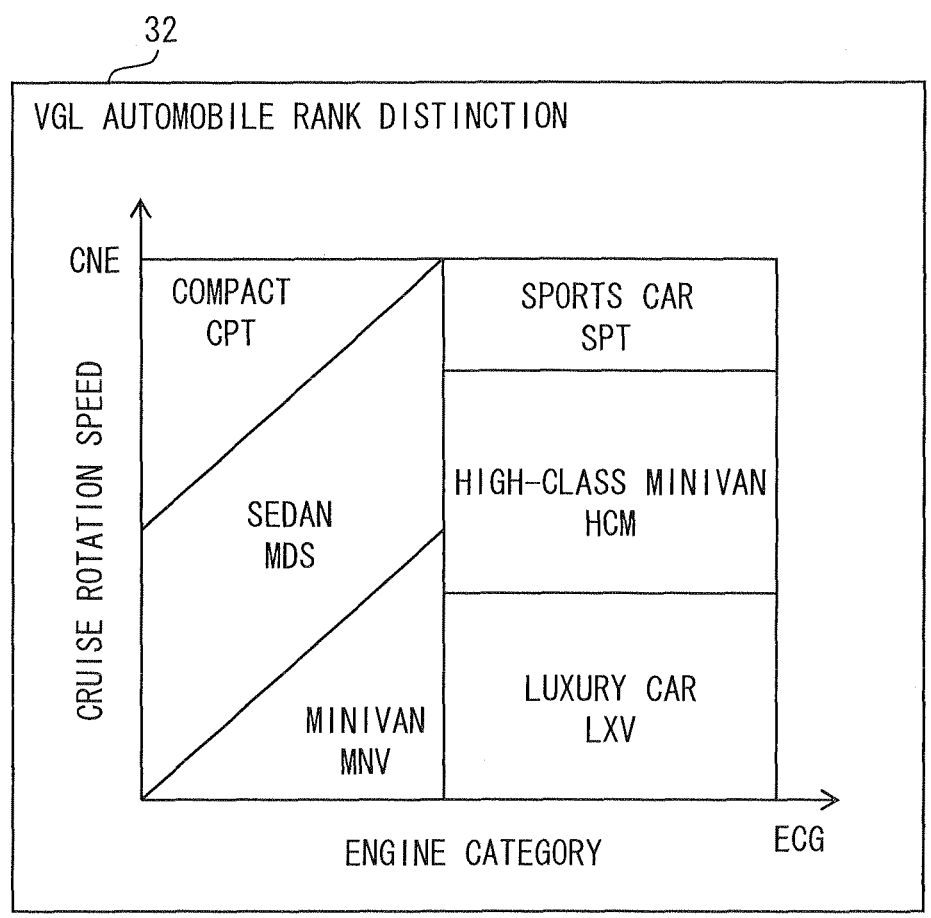
FIG. 21 is a classification view showing a distinction function of a vehicle rank distinction circuit according to the fifth embodiment.

FIG. 21 is a classification view showing a distinction function of the vehicle rank distinction circuit 32 of the fifth embodiment. The vehicle rank distinction circuit 32 distinguishes the vehicle rank according to a category ECG (i.e., displacement) of the engine 2 distinguished with the engine distinction circuit 31 and the cruise rotation speed CNE calculated with the cruise rotation speed distinction 34. The vehicle rank distinction circuit 32 distinguishes the vehicle rank from a compact car (CPT), a medium-size sedan (MDS), a minivan (MNV), a sports car (SPT), a high-class minivan (HCM), and a luxury car (LXV). The category ECG of the engine 2 is classified into multiple regions for distinction of the vehicle rank. In the present embodiment, the category ECG of the engine 2 is classified into two regions of a small and middle displacement region and a large displacement region. The cruise rotation speed CNE is classified into multiple regions for distinction of the vehicle rank. The cruise rotation speed CNE in the small and middle displacement region is classified into three regions of a high-rotation speed region, a middle-rotation speed region, and a low-rotation speed region. Specifically, the compact car is assigned to the high-rotation speed region, the medium-size sedan is assigned to the middle-rotation speed region, and the minivan is assigned to the low-rotation speed region. In the small and middle displacement region, each of the boundary lines between vehicle ranks is set to incline upward and rightward such that the cruise rotation speed CNE increases as the displacement increases. The cruise rotation speed CNE in the large displacement region is classified into three regions of a high-rotation speed region, a middle-rotation speed region, and a low-rotation speed region. Specifically, the sports car is assigned to the high-rotation speed region, the high-class minivan is assigned to the middle-rotation speed region, and the luxury car is assigned to the low-rotation speed region. In the large displacement region, each of the boundary lines between vehicle ranks is set laterally such that the cruise rotation speed CNE is substantially constant as the displacement increases.

Figure 22:
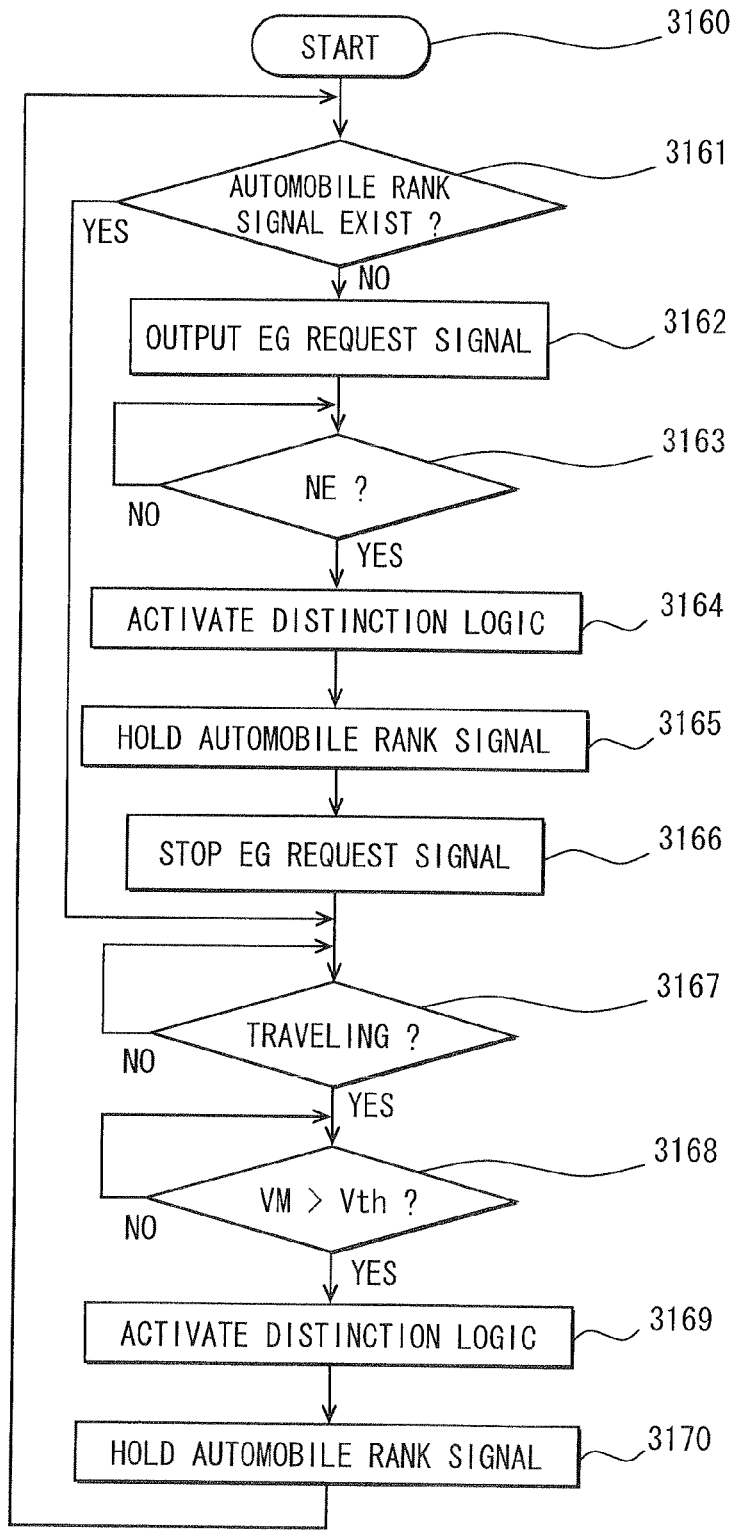
FIG. 22 is a flow chart showing a processing according to the fifth embodiment.

FIG. 22 is a flow chart showing an operation of the generator circuit 8 of the fifth embodiment. It is noted that, although the flow chart shows an operation sequence, the generator circuit 8 may not be a microcomputer. FIG. 22 shows a sequence logic of the operation of the generator circuit 8.

The operation starts from step 3160 when the power source of the generator circuit 8 is activated. As follows, a case where the generator circuit 8 is equipped to the vehicle for the first time and supplied with electricity from the vehicle battery for the first time will be described. At step 3161, it is determined whether the signal representing the vehicle rank is held normally in the hold circuit 50. Immediately after activation of the generator circuit 8 for the first time, the hold circuit 50 does not hold the vehicle rank signal. Therefore, the processing proceeds to step 3162. Alternatively, when the vehicle rank signal is held in the hold circuit 50, the processing proceeds to step 3166.

At step 3162, the generator circuit 8 outputs an engine operation request signal to the ECU 4. In response to the signal, the ECU 4 starts the engine 2, and thereby the engine 2 establishes an operative state of the vehicle. At step 3163, it is determined whether the engine 2 rotates and whether the rotation speed signal NE is detected. When the rotation speed signal NE is detected, the processing proceeds to step 3164. At step 3164, the distinction logic circuit 30 is activated. Thereby, the vehicle rank is distinguished, and the vehicle rank signal is outputted. At step 3165, the vehicle rank signal is held in the hold circuit 50. At step 3166, output of the engine operation request signal is stopped. Thereby, the ECU 4 determines the control state of the engine 2 and stops the engine 2.

Subsequently, the synthetic circuit 12 synthesizes the sound signal for emitting the operation notification sound according to the vehicle rank signal held in the hold circuit 50 and outputs the sound signal. The processing of steps 3161-3166 is implemented with the initial configuration circuit 41.

At step 3167, it is determined whether the vehicle is shifted into the traveling state in which the vehicle uses the engine 2 as a power source while operating the engine 2. When the vehicle is shifted into the traveling state in which the vehicle is driven with the engine 2, the processing proceeds to step 3168. At step 3168, it is determined whether the vehicle speed VM exceeds the predetermined threshold Vth. When the vehicle speed VM exceeds the threshold Vth, the processing proceeds to step 3169. When the vehicle travels at a speed exceeding the predetermined threshold Vth, it is considered that the engine 2 is in the predetermined relatively stable operation state. When the vehicle reaches such a stable traveling state, the generator circuit 8 updates the vehicle rank signal, which is held in the hold circuit 50, and implements the processing for enhancing the distinction accuracy. At step 3169, the distinction logic circuit 30 is activated. Thereby, the vehicle rank is distinguished, and a new vehicle rank signal is outputted. At step 3170, the new vehicle rank signal is held in the hold circuit 50. Consequently, the vehicle rank signal held in the hold circuit 50 is updated. The synthetic circuit 12 synthesizes the sound signal for emitting the operation notification sound according to the vehicle rank signal held in the hold circuit 50 and outputs the sound signal. The processing of steps 3167-3170 is implemented with the update set circuit 42.

Subsequent to step 3170, the processing returns to step 3161 again. The vehicle rank signal held in the hold circuit 50 may be lost due to malfunction of the hold circuit 50 or due to malfunction of the power source. In addition or alternatively, the information held in the hold circuit 50 may be crashed to cause a state where a normal vehicle rank signal is not held. In such a case, the processing from step 3161 to step 3170 is implemented again to reset the vehicle rank signal.

With the configuration according to the present embodiment, the category of the engine 2 and/or the category of the vehicle body can be distinguished according to the signal for distinction reflecting the combustion state of the engine 2. In addition, the operation notification sound is emitted with a tone according to the distinction result. Consequently, the operation notification sound suitable for the vehicle can be emitted. In addition, the generator circuit 8 distinguishes the category of the engine 2 and/or the category of the vehicle body. Therefore, even when the generator circuit 8 is applied to a different vehicle, the operation notification sound can be emitted according to the vehicle. That is, the operation notification sound can be emitted with one hard configuration of the generator circuit 8 adaptively to various displacements and various vehicle ranks of vehicles. Accordingly, it is not necessary to prepare multiple products suited for multiple vehicle ranks. Thus, cost reduction can be enabled by mass production. Furthermore, the operation notification sound can be emitted with a tone according to the vehicle rank, with a low cost hardware configuration, which does not include a microcomputer.

More specifically, the generator circuit 8 distinguishes at least the number of cylinders of the engine 2 and emits the operation notification sound with a tone according to the distinguished number of cylinders. Accordingly, the generator circuit 8 is enabled to emit the operation notification sound without significant uncomfortable feeling.

In addition, according to the present embodiment, the displacement of the engine 2 is distinguished, and the operation notification sound is emitted with a tone according to the distinguished number of cylinders. Accordingly, the generator circuit 8 is enabled to emit the operation notification sound without significant uncomfortable feeling.

In addition, according to the present embodiment, the rotation speed of the engine 2 when the vehicle travels at the specific vehicle speed is distinguished, and the vehicle rank is distinguished according to the distinguished rotation speed of the engine 2. Furthermore, the operation notification sound is emitted with a tone according to the distinguished vehicle rank. With the present configuration, the generator circuit 8 emits the operation notification sound reflecting features such as the size of the vehicle, the weight of the vehicle, and the type of the vehicle. Accordingly, the generator circuit 8 is enabled to emit the operation notification sound without significant uncomfortable feeling.

Furthermore, in the present embodiment, when there is no initial value of the vehicle rank signal for emitting the operation notification sound, the signal is outputted to require the operation of the engine 2. In this way, the vehicle rank can be distinguished at an early stage, and thereby, the operation notification sound can be emitted according to the vehicle rank at an early stage.

(Sixth Embodiment)

Figure 23:
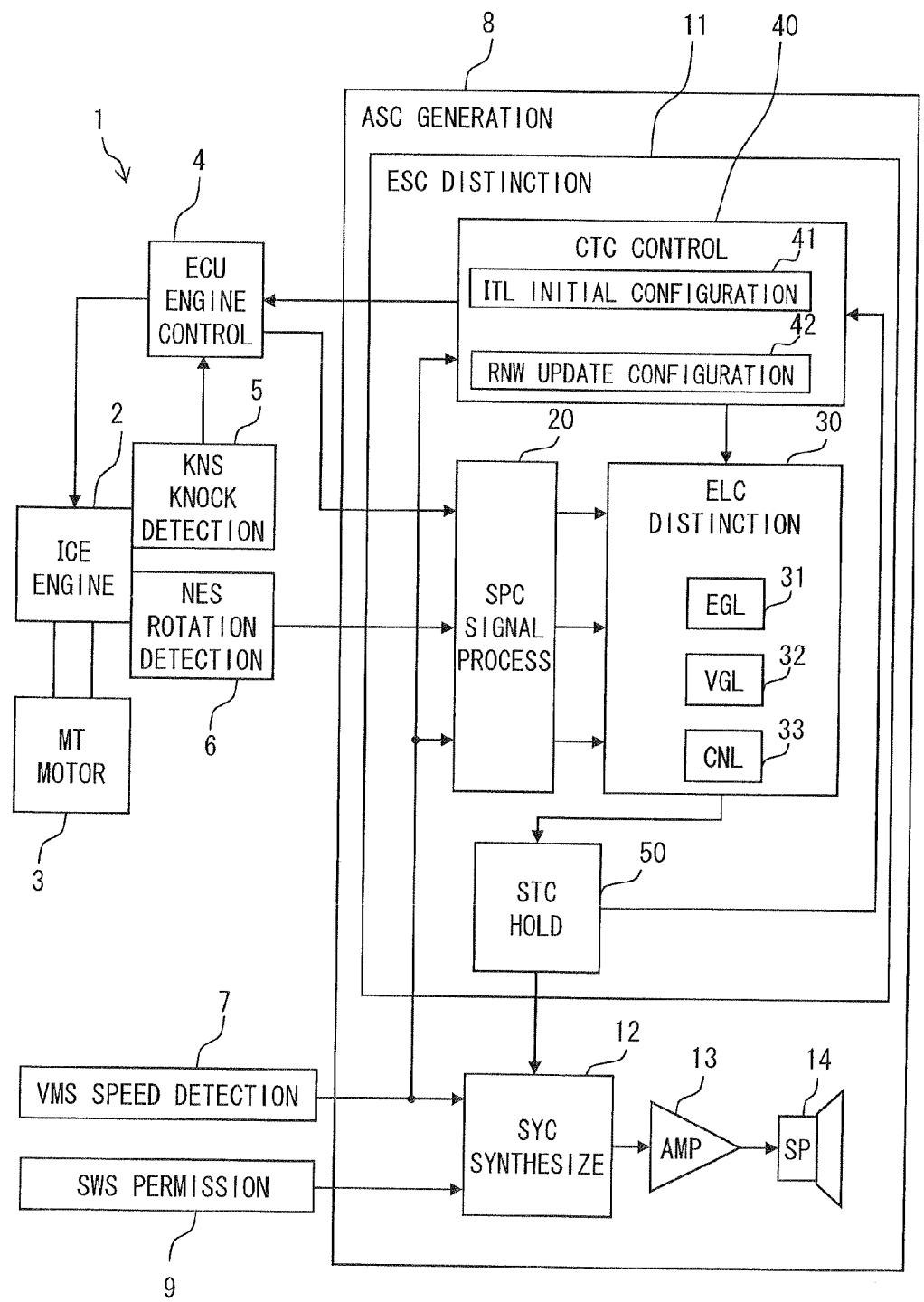
FIG. 23 is a block diagram showing a vehicular system including a generator circuit for a travel notification sound according to the sixth embodiment.

FIG. 23 is a block diagram showing a vehicular system 1 including the generator circuit 8 for the travel notification sound according to the sixth embodiment. In the above embodiments, the generator circuit 8 inputs the knock signal directly from the knock sensor 5. Alternatively, the generator circuit 8 may input the knock signal indirectly. In the present embodiment, the generator circuit 8 inputs the knock signal, which is already processed and sent from the ECU 4. More specifically, for example, the knock signal is processed with a filter circuit provided in the ECU 4 and inputted into the generator circuit 8.

(Other Embodiment)

As described above, the embodiments of the present invention have been described. It is noted that, the present invention is not limited to the above embodiments. The present invention may be variously modified and may be in practical use in a sprit of the present invention. The configurations of the embodiments are examples and do not limit the present invention in these descriptions. The present invention includes various modifications.

For example, in the above embodiments, the synthetic circuit 12 outputs the sound signal modulated according to the vehicle speed VM and the vehicle rank signal. Alternatively, the synthetic circuit 12 may be equipped with a storage unit for storing multiple sound signals and a selection unit for selecting one sound signal from multiple sound signals according to the vehicle speed VM. Alternatively or in addition, the synthetic circuit 12 may be equipped with a selection unit for selecting one sound signal from multiple sound signals according to the vehicle rank signal. The synthetic circuit 12 may electrically switch a target value for synthesizing the sound signal according to the vehicle rank signal when the vehicle travels with the motor 3 thereby to determine the tone of the sound signal according to the vehicle rank in a hardware manner.

In the above embodiments, the hold circuit 50 holds the vehicle rank signal being the distinction result. Alternatively, the vehicle rank signal may be held in a storage device of another control device or in a storage device used for another function. A circuit element may be provided to hold an analog value of the signal for distinction, instead of the vehicle rank signal being the distinction result, thereby to enable to obtain quickly the distinction result in subsequent activation of the device.

In addition to the embodiments or alternatively to the embodiments, a circuit may be equipped for activating the distinction circuit 11 on determination that the vehicle stops according to the vehicle speed signal (VM=0). More specifically, the condition at step 3168 may be replaced to "VM=0?" In this case, the distinction circuit 11 distinguishes the vehicle rank according to the signal for distinction, when the vehicle stops and is in an idling state. In this way, fluctuation caused in the distinction result, when the vehicle travels in a particular environment such as a rough road, can be removed.

In the embodiment, the knock sensor is employed as the combustion state sensor for detecting the combustion state of the engine 2. In addition or alternatively, a combustion pressure sensor for detecting a combustion pressure in the combustion chamber and/or an ion current sensor for detecting combustion flame in the combustion chamber may be employed as the combustion state sensor.

In the above embodiments, the distinction logic circuit 30 includes the engine distinction circuit 31, the vehicle rank distinction circuit 32, the number-of-cylinder distinction circuit 33, and the cruise rotation speed distinction circuit 34 in order to distinguish the vehicle rank comprehensively according to the number of cylinders, the displacement of the engine, and the cruise rotation speed. Alternatively, the distinction logic circuit 30 may distinguish the vehicle rank according to only the number of cylinders or only the displacement of the engine, or according to a combination of the number of cylinders and the displacement of the engine, a combination of the number of cylinders and the cruise rotation speed, or a combination of the displacement of the engine and the cruise rotation speed.

In the above embodiments, the generator circuit 8 is caused to output the operation request signal of the engine 2 to the ECU 4. The generator circuit 8, in general, may have an output terminal for diagnoses, and in this case, the output terminal for diagnoses may be used as an output terminal of the operation request signal. With the present configuration, a terminal and an I/O circuit need not be provided for exclusive use of the operation request signal. Consequently, manufacturing cost can be reduced.

The units and functions of the generator circuit 8 may be configured with only a software or only a hardware or may be configured with a combination of a software and a hardware. For example, the generator circuit 8 may be configured with a microcomputer equipped with a storage medium readable by a computer. In this case, the storage medium stores a program readable by a computer. In this case, the storage medium may be configured with a memory device. In this case, the program causes a control device to operate as a device described in the specification when executed by the control device thereby to cause the control device to implement control methods described in the specification. The units of the generator circuit 8 may function as functional blocks and/or modules to produce predetermined functions.

Summarizing the above embodiments, the vehicle rank distinction device may include the signal processing circuit 20 configured to input: the noise signal from the noise detection unit 14, 505, 605 for detecting the noise caused by combustion in the engine equipped to the vehicle; and the distinction circuit 30 configured to distinguish the vehicle rank of the vehicle equipped with the engine according to the noise signal and the rotation speed.

With the present configuration, the signal processing circuit inputs the noise signal directly or indirectly. The distinction circuit distinguishes the vehicle rank according to the combustion state, which is represented by the noise signal, and the rotation speed, which is represented by the detection signal of the rotation speed sensor. Accordingly, the vehicle rank can be distinguished according to the noise signal.

The signal processing circuit may include a counter circuit 27 configured to: count the noise signal in the time period in which the engine rotates by the predetermined number; and output the frequency signal (NPK) representing the frequency of combustion. The distinction circuit may include the number-of-cylinder distinction circuit 33 configured to distinguish the number of cylinders of the engine according to the frequency signal. With the present configuration, the number of cylinders of the engine representing the vehicle rank can be distinguished according to the noise signal.

The signal processing circuit may include the integration circuit 23 configured to: integrate the noise signal in the time period in which the engine rotates by the predetermined number; and output the intensity signal (SMG) representing the intensity of combustion. The distinction circuit may include the engine distinction circuit 31 configured to distinguish the displacement of the engine according to the intensity signal and the number of cylinders. With the present configuration, the displacement of the engine representing the vehicle rank can be distinguished.

The signal processing circuit may be further configured to input the signal from the vehicle speed sensor 7 for detecting the vehicle speed of the vehicle. The distinction circuit may include: the cruise rotation speed distinction circuit 34 configured to distinguish the rotation speed, when the vehicle speed is at the predetermined vehicle speed, as the cruise rotation speed; and the vehicle rank distinction circuit 32 configured to distinguish the vehicle rank according to the displacement of the engine and the cruise rotation speed. With the present configuration, the vehicle rank is distinguished according to the cruise rotation speed reflecting the relation between the engine output and the size of the vehicle body of the vehicle. Accordingly, the distinguished vehicle rank can reflect the relation between the engine output and the size of the vehicle body of the vehicle.

The vehicle rank distinguished with the distinction circuit may represent the classification of the engine and/or the classification of the vehicle equipped with the engine. With the present configuration, at least one of the engine classification and the classification of the vehicle can be represented with the vehicle rank distinguished with the distinction circuit. Accordingly, useful information can be obtained from the combustion state of the engine.

The vehicle rank may include at least the number of cylinders of the engine. With the present configuration, the vehicle rank can be represented with the number of cylinders of the engine.

The vehicle rank may include at least the displacement of the engine. With the present configuration, the vehicle rank can be represented with the displacement of the engine.

The vehicle rank may include at least the size of the vehicle body of the vehicle. With the present configuration, the vehicle rank can be represented with the size of the vehicle body of the vehicle.

The signal processing circuit may be further configured to input the signal from the vehicle speed sensor 7 for detecting the vehicle speed of the vehicle. The distinction circuit may be further configured to distinguish the vehicle rank according to the vehicle speed. With the present configuration, the vehicle speed can be reflected on distinction of the vehicle rank.

The vehicle rank may include the rotation speed when the vehicle speed is at the predetermined vehicle speed. With the present configuration, the relation between the engine output and the size of the vehicle body of the vehicle is represented with the rotation speed when the vehicle speed is the predetermined vehicle speed. Accordingly, the vehicle rank reflecting the size of the vehicle body of the vehicle can be obtained.

The distinction circuit may be further configured to distinguish the vehicle rank according to the noise signal and the rotation speed when the vehicle speed exceeds the predetermined vehicle speed (VM>Vth). With the present configuration, the vehicle rank is determined according to the noise signal and the rotation speed in a stable traveling state in which the vehicle speed exceeds the predetermined vehicle speed. Accordingly, the vehicle rank can be distinguished steadily and constantly.

The distinction circuit may be further configured to distinguish the vehicle rank according to the noise signal and the rotation speed when the vehicle speed represents stop of the vehicle (VM=0). With the present configuration, the vehicle rank is determined according to the noise signal and the rotation speed in the state in which the vehicle stops and is steady. Accordingly, the vehicle rank can be distinguished steadily and constantly.

The time period, in which the noise signal is monitored in order to distinguish the vehicle rank, may be variable. With the present configuration, the quantity of information for distinguishing the vehicle rank can be adjusted. Further, with the present configuration, the distinction circuit may include the adjustment circuit configured to adjust the monitoring time period. For example, the vehicle rank can be distinguished in a short time by setting the monitoring time period at a short time period. To the contrary, the vehicle rank can be distinguished with high accuracy by setting the monitoring time period at a long time period thereby to spend a long time period.

The vehicle rank distinction device may further include the hold circuit 50 configured to hold the signal, which represents the vehicle rank distinguished with the distinction circuit, until subsequent distinction. With the present configuration, the signal representing the vehicle rank distinguished with the distinction circuit is held. Accordingly, the held vehicle rank can be provided, even before implementation of the subsequent distinction with the distinction circuit. For example, the hold circuit holds the signal representing the vehicle rank, even when the operation of the vehicle is stopped and the electric power switch is deactivated. In this way, even immediately after activation of the electric power switch again, the vehicle rank can be obtained from the hold circuit.

A travel sound generator device may be configured to emit the operation notification sound for notifying operation of the vehicle. The travel sound generator device may include: the vehicle rank distinction device 11; and the synthetic circuit 12 configured to emit a sound with a tone according to the vehicle rank distinguished with the distinction circuit. With the present configuration, the operation notification sound according to the vehicle rank can be emitted. Accordingly, it is not necessary to design and manufacture multiple travel sound generator devices suited for multiple vehicle ranks.

Alternatively, the vehicle rank distinction device may include: the signal processing circuit 320, 420 configured to input: the control signal for the fuel injection valve 305 and/or the igniter 405 of the engine equipped to the vehicle; and the signal from the rotation speed sensor 6 for detecting the rotation speed of the engine; and the distinction circuit 30, 430 configured to distinguish the vehicle rank of the vehicle equipped with the engine according to the control signal and the rotation speed.

With the present configuration, the signal processing circuit inputs directly or indirectly the control signal of the fuel injection valve and/or the igniter and the detection signal of the rotation speed sensor. The distinction circuit distinguishes the vehicle rank according to the combustion state, which is represented by the control signal, and the rotation speed, which is represented by the detection signal of the rotation speed sensor. Accordingly, the vehicle rank can be distinguished according to the control signal of the fuel injection valve and/or the igniter.

The control signal may be the control signal for the fuel injection valve 305 or the control signal for the igniter 405. In this case, the signal processing circuit may include the counter circuit 27 configured to: count the control signal in the time period in which the engine rotates by the predetermined number; and output the frequency signal (NPK) representing the frequency of combustion. The distinction circuit may include the number-of-cylinder distinction circuit 33 configured to distinguish the number of cylinders of the engine according to the frequency signal. With the present configuration, the number of cylinders of the engine representing the vehicle rank can be distinguished according to the control signal.

The control signal may be the control signal for the fuel injection valve 305. In this case, the signal processing circuit may include the integration circuit 23 configured to: integrate the control signal in the time period in which the engine rotates by the predetermined number; and output the intensity signal (SMG) representing the intensity of combustion. The distinction circuit may include the engine distinction circuit 31 configured to distinguish the displacement of the engine according to the intensity signal and the number of cylinders. With the present configuration, the displacement of the engine representing the vehicle rank can be distinguished.

The signal processing circuit may be further configured to input the signal from the vehicle speed sensor 7 for detecting the vehicle speed of the vehicle. The distinction circuit may include the cruise rotation speed distinction circuit 34 configured to distinguish the rotation speed, when the vehicle speed is at the predetermined vehicle speed, as the cruise rotation speed; and the vehicle rank distinction circuit 32 configured to distinguish the vehicle rank according to the displacement of the engine and the cruise rotation speed. With the present configuration, the vehicle rank is distinguished according to the cruise rotation speed reflecting the relation between the engine output and the size of the vehicle body of the vehicle. Accordingly, the distinguished vehicle rank can reflect the relation between the engine output and the size of the vehicle body of the vehicle.

The vehicle rank distinguished with the distinction circuit may represent the classification of the engine and/or the classification of the vehicle equipped with the engine. With the present configuration, at least one of the engine classification and the classification of the vehicle can be represented with the vehicle rank distinguished with the distinction circuit. Accordingly, useful information can be obtained from the combustion state of the engine.

The vehicle rank may include at least the number of cylinders of the engine. With the present configuration, the vehicle rank can be represented with the number of cylinders of the engine.

The vehicle rank may include at least the displacement of the engine. With the present configuration, the vehicle rank can be represented with the displacement of the engine.

The vehicle rank may include at least the size of the vehicle body of the vehicle. With the present configuration, the vehicle rank can be represented with the size of the vehicle body of the vehicle.

The signal processing circuit may be further configured to input the signal from the vehicle speed sensor 7 for detecting the vehicle speed of the vehicle. The distinction circuit may be further configured to distinguish the vehicle rank according to the vehicle speed. With the present configuration, the vehicle speed can be reflected on distinction of the vehicle rank.

The vehicle rank may include the rotation speed when the vehicle speed is at the predetermined vehicle speed. With the present configuration, the relation between the engine output and the size of the vehicle body of the vehicle is represented with the rotation speed when the vehicle speed is the predetermined vehicle speed. Accordingly, the vehicle rank reflecting the size of the vehicle body of the vehicle can be obtained.

The distinction circuit may be further configured to distinguish the vehicle rank according to the control signal and the rotation speed when the vehicle speed exceeds the predetermined vehicle speed (VM>Vth). With the present configuration, the vehicle rank is determined according to the control signal and the rotation speed in a stable traveling state in which the vehicle speed exceeds the predetermined vehicle speed. Accordingly, the vehicle rank can be distinguished steadily and constantly.

The distinction circuit may be further configured to distinguish the vehicle rank according to the control signal and the rotation speed when the vehicle speed represents stop of the vehicle (VM=0). With the present configuration, the vehicle rank is determined according to the control signal and the rotation speed in the state in which the vehicle stops and is steady. Accordingly, the vehicle rank can be distinguished steadily and constantly.

The time period, in which the control signal is monitored in order to distinguish the vehicle rank, may be variable. With the present configuration, the quantity of information for distinguishing the vehicle rank can be adjusted. Further, with the present configuration, the distinction circuit may include the adjustment circuit configured to adjust the monitoring time period. For example, the vehicle rank can be distinguished in a short time by setting the monitoring time period at a short time period. To the contrary, the vehicle rank can be distinguished with high accuracy by setting the monitoring time period at a long time period thereby to spend a long time period.

The vehicle rank distinction device may further include the hold circuit 50 configured to hold the signal, which represents the vehicle rank distinguished with the distinction circuit, until subsequent distinction. With the present configuration, the signal representing the vehicle rank distinguished with the distinction circuit is held. Accordingly, the held vehicle rank can be provided, even before implementation of the subsequent distinction with the distinction circuit. For example, the hold circuit holds the signal representing the vehicle rank, even when the operation of the vehicle is stopped and the electric power switch is deactivated. In this way, even immediately after activation of the electric power switch again, the vehicle rank can be obtained from the hold circuit.

The travel sound generator device may be configured to emit the operation notification sound for notifying operation of the vehicle. The travel sound generator device may include: the vehicle rank distinction device 11; and the synthetic circuit 12 configured to emit a sound with a tone according to the vehicle rank distinguished with the distinction circuit. With the present configuration, the operation notification sound according to the vehicle rank can be emitted. Accordingly, it is not necessary to design and manufacture multiple travel sound generator devices suited for multiple vehicle ranks.

Alternatively, the vehicle rank distinction device may include the signal processing circuit 20 configured to input: the signal from the combustion state sensor 5 for detecting the combustion state of the engine equipped to the vehicle; and the signal from the rotation speed sensor 6 for detecting the rotation speed of the engine; and the distinction circuit 30 configured to distinguish the vehicle rank of the vehicle equipped with the engine according to the combustion state and the rotation speed.

With the present configuration, the signal processing circuit inputs directly or indirectly the detection signal of the combustion state sensor and the detection signal of the rotation speed sensor. The distinction circuit distinguishes the vehicle rank according to the combustion state, which is represented by the detection signal of the combustion state sensor, and the rotation speed, which is represented by the detection signal of the rotation speed sensor. Accordingly, the vehicle rank can be distinguished according to the detection signal of the combustion state sensor.

The combustion state sensor may be the knock sensor 5 configured to detect a knock caused by combustion in the engine and to output the knock signal. With the present configuration, the vehicle rank can be distinguished according to the detection signal of the knock sensor.

The signal processing circuit may include the counter circuit 27 configured to: count the knock signal in the time period in which the engine rotates by the predetermined number; and output the frequency signal (NPK) representing the frequency of combustion. The distinction circuit may include the number-of-cylinder distinction circuit 33 configured to distinguish the number of cylinders of the engine according to the frequency signal. With the present configuration, the number of cylinders of the engine representing the vehicle rank can be distinguished according to the knock signal.

The signal processing circuit may include the integration circuit 23 configured to: integrate the knock signal in the time period in which the engine rotates by the predetermined number; and output the intensity signal (SMG) representing the intensity of combustion. The distinction circuit may include the engine distinction circuit 31 configured to distinguish the displacement of the engine according to the intensity signal and the number of cylinders. With the present configuration, the displacement of the engine representing the vehicle rank can be distinguished.

The signal processing circuit may be further configured to input the signal from the vehicle speed sensor 7 for detecting the vehicle speed of the vehicle. The distinction circuit may include the cruise rotation speed distinction circuit 34 configured to distinguish the rotation speed, when the vehicle speed is at the predetermined vehicle speed, as the cruise rotation speed; and the vehicle rank distinction circuit 32 configured to distinguish the vehicle rank according to the displacement of the engine and the cruise rotation speed. With the present configuration, the vehicle rank is distinguished according to the cruise rotation speed reflecting the relation between the engine output and the size of the vehicle body of the vehicle. Accordingly, the distinguished vehicle rank can reflect the relation between the engine output and the size of the vehicle body of the vehicle, The vehicle rank distinguished with the distinction circuit may represent the classification of the engine and/or the classification of the vehicle equipped with the engine. With the present configuration, at least one of the engine classification and the classification of the vehicle can be represented with the vehicle rank distinguished with the distinction circuit. Accordingly, useful information can be obtained from the combustion state of the engine.

The vehicle rank may include at least the number of cylinders of the engine. With the present configuration, the vehicle rank can be represented with the number of cylinders of the engine.

The vehicle rank may include at least the displacement of the engine. With the present configuration, the vehicle rank can be represented with the displacement of the engine.

The vehicle rank may include at least the size of the vehicle body of the vehicle. With the present configuration, the vehicle rank can be represented with the size of the vehicle body of the vehicle.

The signal processing circuit may be further configured to input the signal from the vehicle speed sensor 7 for detecting the vehicle speed of the vehicle. The distinction circuit may be further configured to distinguish the vehicle rank according to the vehicle speed. With the present configuration, the vehicle speed can be reflected on distinction of the vehicle rank.

The vehicle rank may include the rotation speed when the vehicle speed is at the predetermined vehicle speed. With the present configuration, the relation between the engine output and the size of the vehicle body of the vehicle is represented with the rotation speed when the vehicle speed is the predetermined vehicle speed. Accordingly, the vehicle rank reflecting the size of the vehicle body of the vehicle can be obtained.

The distinction circuit may be further configured to distinguish the vehicle rank according to the combustion state and the rotation speed when the vehicle speed exceeds the predetermined vehicle speed (VM>Vth). With the present configuration, the vehicle rank is determined according to the combustion state and the rotation speed in a stable traveling state in which the vehicle speed exceeds the predetermined vehicle speed. Accordingly, the vehicle rank can be distinguished steadily and constantly.

The distinction circuit may be further configured to distinguish the vehicle rank according to the combustion state and the rotation speed when the vehicle speed represents stop of the vehicle (VM=0). With the present configuration, the vehicle rank is determined according to the combustion state and the rotation speed in the state in which the vehicle stops and is steady. Accordingly, the vehicle rank can be distinguished steadily and constantly.

The time period, in which the signal from the combustion state sensor is monitored in order to distinguish the vehicle rank, may be variable. With the present configuration, the quantity of information for distinguishing the vehicle rank can be adjusted. Further, with the present configuration, the distinction circuit may include the adjustment circuit configured to adjust the monitoring time period. For example, the vehicle rank can be distinguished in a short time by setting the monitoring time period at a short time period. To the contrary, the vehicle rank can be distinguished with high accuracy by setting the monitoring time period at a long time period thereby to spend a long time period.

The vehicle rank distinction device may include the hold circuit 50 configured to hold the signal, which represents the vehicle rank distinguished with the distinction circuit, until subsequent distinction. With the present configuration, the signal representing the vehicle rank distinguished with the distinction circuit is held. Accordingly, the held vehicle rank can be provided, even before implementation of the subsequent distinction with the distinction circuit. For example, the hold circuit holds the signal representing the vehicle rank, even when the operation of the vehicle is stopped and the electric power switch is deactivated. In this way, even immediately after activation of the electric power switch again, the vehicle rank can be obtained from the hold circuit.

The travel sound generator device may be configured to emit the operation notification sound for notifying operation of the vehicle. The travel sound generator device may include: the vehicle rank distinction device 11; and the synthetic circuit 12 configured to emit a sound with a tone according to the vehicle rank distinguished with the distinction circuit. With the present configuration, the operation notification sound according to the vehicle rank can be emitted. Accordingly, it is not necessary to design and manufacture multiple travel sound generator devices suited for multiple vehicle ranks.

The reference numerals denoted on the components of the vehicle rank distinction device and the travel sound generator device do not limit the specific configuration.

The above structures of the embodiments can be combined as appropriate.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle rank distinction device comprising:
a signal processing circuit configured to input:
  a control signal for a fuel injection valve and/or an igniter of an engine equipped to a vehicle; and
  a signal from a rotation speed sensor or detecting a rotation speed of the engine; and
a distinction circuit configured to distinguish a vehicle rank of the vehicle equipped with the engine according to the control signal and the rotation speed: wherein
the control signal is for controlling the fuel injection valve or a control signal for the igniter,
the signal processing circuit includes a count circuit configured to:
  count the control signal in a time period in which the engine rotates by a predetermined number; and
  output a frequency signal representing a frequency of combustion, and
the distinction circuit includes a number-of-cylinder distinction circuit configured to distinguish a number of cylinders of the engine according to the frequency signal.

2. The vehicle rank distinction device according to claim 1, wherein the control signal is for controlling the fuel injection valve,
the signal processing circuit further includes an integration circuit configured to:
  integrate the control signal in the time period in which the engine rotates by the predetermined number; and
  output an intensity signal representing an intensity of combustion, and
the distinction circuit further includes an engine distinction circuit configured to distinguish a displacement of the engine according to the intensity signal and the number of cylinders.

3. The vehicle rank distinction device according to claim 2, wherein
the signal processing circuit is further configured to input a signal from a vehicle speed sensor for detecting a vehicle speed of the vehicle, and the distinction circuit further includes:
  a cruise rotation speed distinction circuit configured to distinguish the rotation speed as a cruise rotation speed when the vehicle speed is at a predetermined vehicle speed; and
  a vehicle rank distinction circuit configured to distinguish the vehicle rank according to the displacement of the engine and the cruise rotation speed.

4. The vehicle rank distinction device according to claim 1, wherein the vehicle rank distinguished with the distinction circuit represents a classification of the engine and/or a classification of the vehicle equipped with the engine.

5. The vehicle rank distinction device according to claim 4, wherein the vehicle rank includes at least the number of cylinders of the engine.

6. The vehicle rank distinction device according to claim 4, wherein the vehicle rank includes at least the displacement of the engine.

7. The vehicle rank distinction device according to claim 4, wherein the vehicle rank includes at least a size of a vehicle body of the vehicle.

8. The vehicle rank distinction device according to claim 1, wherein a time period, in which the control signal is monitored in order to distinguish the vehicle rank, is variable.

9. The vehicle rank distinction device according to claim 1, further comprising:
a hold circuit configured to hold a signal, which represents the vehicle rank distinguished with the distinction circuit, until subsequent distinction.

10. A travel sound generator device configured to emit an operation notification sound for notifying operation of the vehicle, the travel sound generator device comprising:
the vehicle rank distinction device according to claim 1; and
a synthetic circuit configured to emit a sound with a tone according to the vehicle rank distinguished with the distinction circuit.

11. A vehicle rank distinction device comprising:
a signal processing circuit configured to input:
  a control signal for a fuel injection valve and/or an igniter of an engine equipped to a vehicle; and
  a signal from a rotation speed sensor for detecting rotation speed of the engine; and
a distinction circuit configured to distinguish a vehicle rank of the vehicle equipped with the engine according to the control signal and the rotation speed; wherein
the signal processing circuit is further configured to input a signal from a vehicle speed sensor for detecting a vehicle speed of the vehicle, and
the distinction circuit is further configured to distinguish the vehicle rank according to the vehicle speed.

12. The vehicle rank distinction device according to claim 11, wherein the vehicle rank includes the rotation speed when the vehicle speed is at a predetermined vehicle speed.

13. The vehicle rank distinction device according to claim 11, wherein the distinction circuit is further configured to distinguish the vehicle rank according to the control signal and the rotation speed when the vehicle speed exceeds a predetermined vehicle speed.

14. The vehicle rank distinction device according to claim 11, wherein the distinction circuit is further configured to distinguish the vehicle rank according to the control signal and the rotation speed when the vehicle speed represents stop of the vehicle.

15. The vehicle rank distinction device according to claim 11, wherein a time period, in which the control signal is monitored in order to distinguish the vehicle rank, is variable.

16. The vehicle rank distinction device according to claim 11, further comprising:
a hold circuit configured to hold a signal, which represents the vehicle rank distinguished with the distinction circuit, until subsequent distinction.

17. A travel sound generator device configured to emit an operation notification sound for notifying operation of the vehicle, the travel sound generator device comprising:
the vehicle rank distinction device according to claim 11; and
a synthetic circuit configured to emit a sound with a tone according to the vehicle rank distinguished with the distinction circuit.

* * * * *